United States Patent
Echigo et al.

(10) Patent No.: US 9,080,048 B2
(45) Date of Patent: Jul. 14, 2015

(54) POLYMER MICROPARTICLES AND PROCESS FOR PRODUCTION THEREOF

(75) Inventors: Yuji Echigo, Nagoya (JP); Itaru Asano, Nagoya (JP); Hiroshi Kobayashi, Nagoya (JP); Hiroshi Takezaki, Nagoya (JP)

(73) Assignee: Toray Industries, Inc. (JP)

( * ) Notice: Subject to any disclaimer, the term of this patent is extended or adjusted under 35 U.S.C. 154(b) by 205 days.

(21) Appl. No.: 13/876,375

(22) PCT Filed: Sep. 27, 2011

(86) PCT No.: PCT/JP2011/071954
§ 371 (c)(1),
(2), (4) Date: Mar. 27, 2013

(87) PCT Pub. No.: WO2012/043509
PCT Pub. Date: Apr. 5, 2012

(65) Prior Publication Data
US 2013/0183528 A1    Jul. 18, 2013

(30) Foreign Application Priority Data

Sep. 28, 2010 (JP) .................. 2010-217158
Mar. 18, 2011 (JP) .................. 2011-060298

(51) Int. Cl.
| | |
|---|---|
| *C08K 5/34* | (2006.01) |
| *C08L 29/04* | (2006.01) |
| *C08L 77/00* | (2006.01) |
| *C08J 3/14* | (2006.01) |

(52) U.S. Cl.
CPC .. *C08L 77/00* (2013.01); *C08J 3/14* (2013.01); *C08J 2367/00* (2013.01); *C08J 2377/00* (2013.01); *C08J 2381/04* (2013.01); *Y10T 428/2982* (2015.01)

(58) Field of Classification Search
USPC ...................................... 524/104
See application file for complete search history.

(56) References Cited

U.S. PATENT DOCUMENTS 8,574,669 B2 * 11/2013 Asano et al. .............. 427/212
2011/0070442 A1   3/2011 Asano et al.

FOREIGN PATENT DOCUMENTS

| JP | 4-239540 | | 8/1992 |
|---|---|---|---|
| JP | 6-305019 | | 11/1994 |
| JP | 09-165457 | | 6/1997 |
| JP | 10-504045 | | 4/1998 |
| JP | 11-302568 | | 11/1999 |
| JP | 2001081130 | * | 3/2001 |
| JP | 2004-330727 | | 11/2004 |
| WO | 88/08011 | | 10/1988 |
| WO | 94/06059 | | 3/1994 |
| WO | 2009/142231 | | 11/2009 |

OTHER PUBLICATIONS

Translation of JP 2001-081130, Mar. 27, 2001.*
Yamamoto, H., "SP Value, Base, Application and Calculation Method", Johokiko Co., Ltd., Mar. 31, 2005, pp. 118, 54-69 and 1 sheet of an English abridged translation.
Brandrup, J. et al., "Polymer Handbook Fourth Edition", Wiley, 1998, cover and pp. 675-715.
"Chemical Handbook (Third revision, Chemical Handbook, Basic Version," edited by Japanese Chemical Society, Maruzen Co., Ltd., 1984, cover, pp. 336-344 and 1 sheet of an English abridged translation.
JIS K 6762, "Testing Polyvinyl Alcohol," Japanese Standards Association, 1994 (4 pages).
JIS Z 8741, "Specular Glossiness—Methods of Measurement," Japanese Standards Association, 1997 (9 pages).
Supplementary European Search Report dated Jul. 21, 2014 from corresponding European Patent Application No. 11 82 9062.

* cited by examiner

*Primary Examiner* — Hui Chin
(74) *Attorney, Agent, or Firm* — DLA Piper LLP (US)

(57) ABSTRACT

A process of producing polymer microparticles wherein, in a system which includes a polymer (A), a polymer (B) and an organic solvent and can cause phase separation into two phases of a solution phase mainly composed of the polymer (A) and a solution phase mainly composed of the polymer (B) when the polymer (A), the polymer (B) and the organic solvent are dissolved and mixed together, after an emulsion is formed at a temperature of 100° C. or higher, the polymer (A) is precipitated by bringing a poor solvent for the polymer (A) into contact with the emulsion.

18 Claims, 2 Drawing Sheets

FIG. 2
(A)
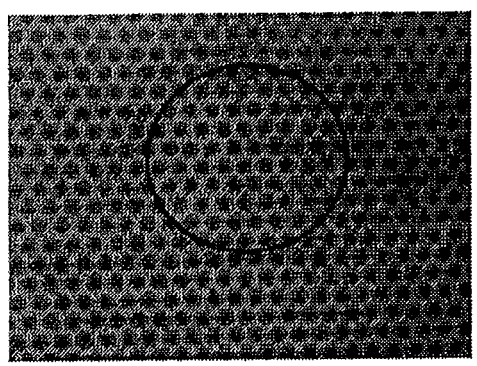
White spot : none
(B)
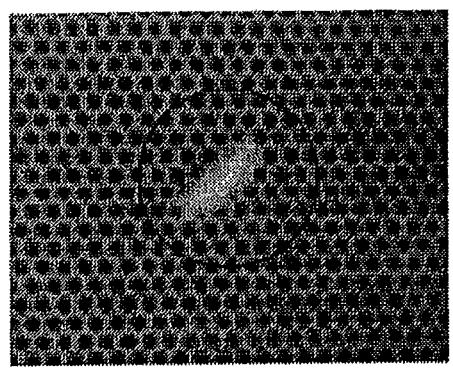
White spot : present

POLYMER MICROPARTICLES AND PROCESS FOR PRODUCTION THEREOF

TECHNICAL FIELD

This disclosure relates to polymer microparticles and a process for production thereof and, in more detail, relates to a process for producing microparticles composed of a highly heat-resistant polymer such as a polyamide or a polyester with a narrow particle diameter distribution in a simple manner, and polymer microparticles produced by the process.

BACKGROUND

The polymer microparticles means microparticles composed of a polymer, and the microparticles generally have a wide range of diameters from several tens of nm to several hundreds of µm. Differently from polymer molded products such as films, fibers, injection molded products, and extrusion molded products, polymer microparticles are used for modification and improvement of various materials by utilizing the large specific surface area and the structure of microparticles. Their major uses include modifiers for cosmetics, additives for toners, rheology modifiers for paints and the like, agents for medical diagnosis and examination, and additives for molded products such as automobile materials and construction materials. In particular, they have been in wider use in recent years owing to the advantageous microparticle structure of polymer microparticles, as materials for rapid prototyping and rapid manufacturing, i.e., techniques to produce custom-made molded products combining with laser processing technologies.

Furthermore, recently, as such polymer microparticles, in fields of electronic information materials and the like such as liquid crystal displays, there are increasing demands for polymer microparticles that are high in heat resistance and solvent resistance, and more uniform in particle diameter distribution.

We previously found a process for producing polymer microparticles wherein two kinds of polymers are dissolved into a solvent, and by bringing a poor solvent into contact with the emulsion comprising respective phases, polymer microparticles are precipitated (WO 2009/142231).

This process has features that adjustment of emulsion diameter is easy and the particle diameter distribution is narrow, and it is an effective manner capable of making microparticles for wide range of kinds of polymers and an effective manner for obtaining microparticles composed of a highly heat-resistant polymer.

Although the conventional processes disclose that different kinds of polymers are dissolved into a solvent, and after an emulsion is formed, microparticles are formed by bringing a poor solvent into contact therewith, in case where a highly heat-resistant polymer, particularly, a crystalline polymer, is made into microparticles, there is a problem that the viscosity of the system becomes high at the step for forming the emulsion, and the particle diameter distribution tends to become wider.

There is therefore a need to provide a process of stably producing high-quality polymer microparticles having a smaller particle diameter distribution in the production process of polymer microparticles wherein two kinds of polymers are dissolved into a solvent and polymer microparticles are precipitated by bringing a poor solvent into contact with an emulsion comprising respective phases, and polymer microparticles produced by the process.

SUMMARY

We thus provide:

(1) A process for producing polymer microparticles wherein, in a system which comprises a polymer (A), a polymer (B) and an organic solvent and can cause phase separation into two phases of a solution phase mainly composed of the polymer (A) and a solution phase mainly composed of the polymer (B) when the polymer (A), the polymer (B) and the organic solvent are dissolved and mixed together, after an emulsion is formed, the polymer (A) is precipitated by bringing a poor solvent for the polymer (A) into contact with the emulsion, characterized in that forming of the emulsion is carried out at a temperature of 100° C. or higher.

(2) The process for producing polymer microparticles according to (1), wherein the polymer (A) is a crystalline thermoplastic resin having a melting point of 100° C. or higher.

(3) The process for producing polymer microparticles according to (1) or (2), wherein the polymer (A) is a crystalline thermoplastic resin containing at least one structural unit, selected from the group consisting of an amide unit, an ester unit, a sulfide unit and a carbonate unit, in a molecular principal chain structure of said polymer (A).

(4) The process for producing polymer microparticles according to any of (1) to (3), wherein the polymer (A) is a crystalline thermoplastic resin selected from the group consisting of a polyamide group, a polyester group and a polyphenylene sulfide group.

(5) The process for producing polymer microparticles according to any of (1) to (4), wherein an SP value of the polymer (B) is 20 $(J/cm^3)^{1/2}$ or higher.

(6) The process for producing polymer microparticles according to any of (1) to (5), wherein a solubility into water at 25° C. of the polymer (B) is 1 (g/100 g) or greater.

(7) The process for producing polymer microparticles according to any of (1) to (6), wherein the polymer (B) has a hydroxyl group, an ether group, an amide group or a carboxyl group in a molecular structure of said polymer (B).

(8) The process for producing polymer microparticles according to any of (1) to (7), wherein the polymer (B) is any of a polyvinyl alcohol group, a hydroxyalkyl cellulose, a polyalkylene glycol, a polyvinylpyrrolidone, a water-soluble Nylon and a polyacrylic acid.

(9) The process for producing polymer microparticles according to any of (1) to (8), wherein the polymer (B) is a polyvinyl alcohol group, and a content of a sodium acetate in said polyvinyl alcohol group is 0.1 mass % or less.

(10) The process for producing polymer microparticles according to any of (1) to (8), wherein the polymer (B) is a polyvinyl alcohol group, and at the time of forming said emulsion, an acid compound is added into said system.

(11) The process for producing polymer microparticles according to (10), wherein the added acid compound is an acid having a first dissociative index (pKa1) of 4.5 or less, and its decomposition temperature is a boiling point of said poor solvent or higher.

(12) The process for producing polymer microparticles according to (10) or (11), wherein the added acid compound is one or more selected from the group consisting of a citric acid, a tartaric acid, a malonic acid, an oxalic acid, an adipic acid, a maleic acid, a malic acid, phthalic acid, a succinic acid and a polyacrylic acid.

(13) The process for producing polymer microparticles according to any of (1) to (12), wherein an SP value of said organic solvent is 20 $(J/cm^3)^{1/2}$ or higher, and a boiling point thereof is 100° C. or higher.

(14) The process for producing polymer microparticles according to any of (1) to (13), wherein said organic solvent is one or more selected from the group consisting of N-methylpyrrolidone, dimethylsulfoxide, N,N-dimethylformamide, N,N-dimethylacetamide and 1,3-dimethyl-2-imidazolidinone.

(15) The process for producing polymer microparticles according to any of (1) to (14), wherein a temperature, at which the poor solvent is brought into contact with the emulsion for precipitating the polymer (A) after the emulsion is formed, is a temperature of a cooling crystallization temperature of the polymer (A) or higher.

(16) The process for producing polymer microparticles according to any of (1) to (15), wherein a solid component and a liquid component are separated after the polymer (A) is precipitated, the poor solvent is removed from a solution containing polymer (B) component removed with microparticles of the polymer (A), and the polymer (A) is added again to a solution having been obtained to form a system which can cause phase separation into two phases of the solution phase mainly composed of the polymer (A) and the solution phase mainly composed of the polymer (B), thereby recycling the organic solvent and the polymer (B).

(17) Polymer microparticles produced by a process according to any of (1) to (16).

(18) Polymer microparticles characterized in that the microparticles have a flexural elastic modulus of more than 500 MPa and 3000 MPa or less, and are composed of a thermoplastic resin containing an ether bond.

(19) The polymer microparticles according to (18), wherein an average particle diameter of the microparticles is in a range of 1 μm to 100 μm.

By the process of producing polymer microparticles, it becomes possible to produce microparticles of various types of polymers including a highly heat-resistant polymer stably at a high quality, and it becomes possible to produce microparticles having a small particle diameter distribution stably in a simple manner. Particularly, the microparticles can be used as a material suitable for the concavo-convex formation on a reflector that is used in a thin liquid crystal display.

BRIEF DESCRIPTION OF THE DRAWINGS

FIG. 2 depicts diagrams showing examples of determination of display white spots, and exemplifies a case present with no white spot (A) and a case present with a white spot (B).

DETAILED DESCRIPTION

Figure 1:
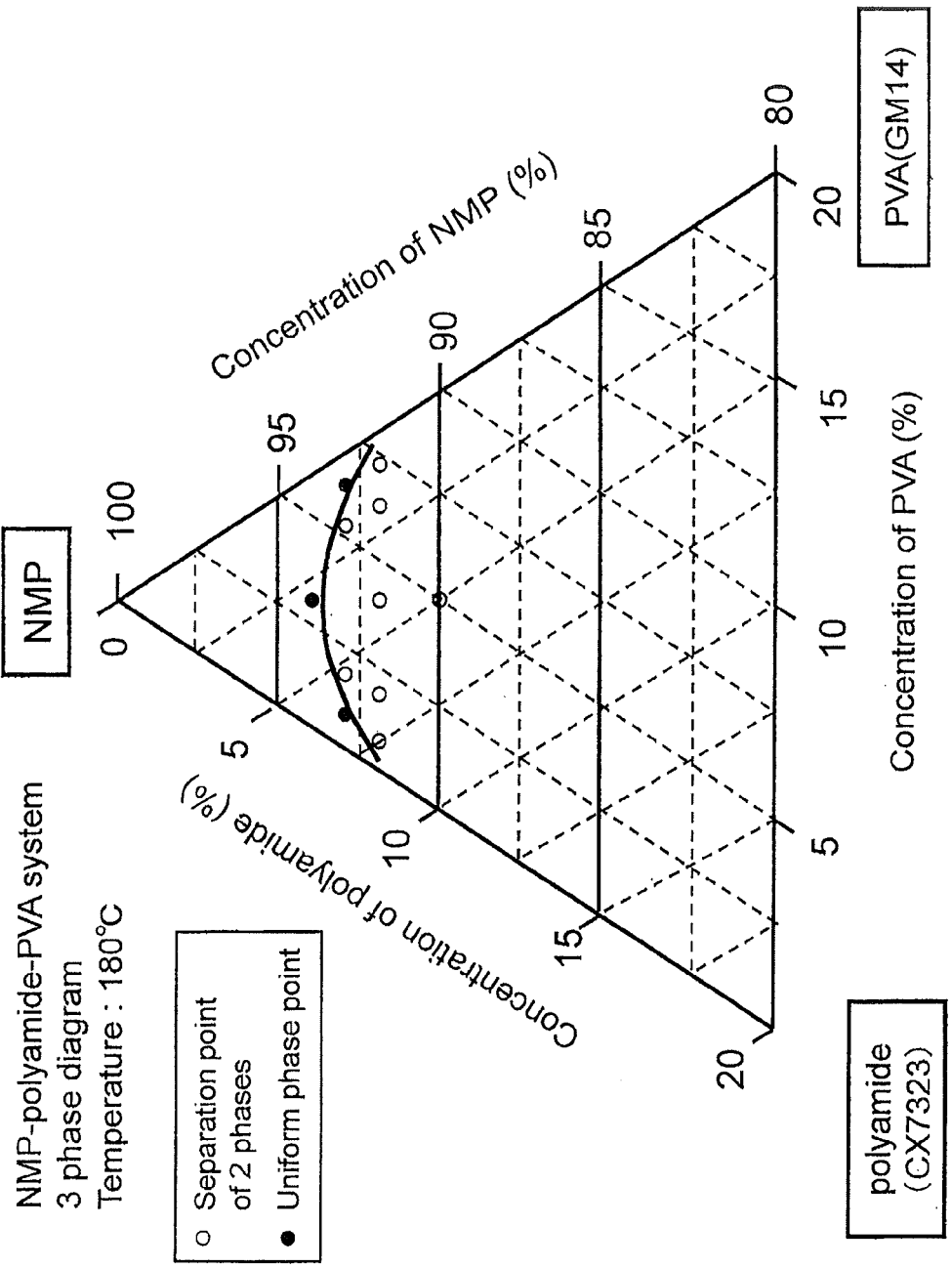
FIG. 1 shows a three-component phase diagram at 180° C. of a polyamide (supplied by Daicel-Evonik Ltd., "TROGAMID" (registered trademark) CX7323), a polyvinyl alcohol (PVA (supplied by Nippon Synthetic Chemical Industry Co., Ltd., "Gohsenol" (registered trademark) GM 14)) and an N-methyl-2-pyrrolidone (NMP).

Hereinafter, our microparticles and processes will be explained in detail.

We provide a process of producing polymer microparticles wherein, in a system in which a polymer (A), a polymer (B) and an organic solvent are dissolved and mixed together and which can cause phase separation into two phases of a solution phase mainly composed of the polymer (A) (hereinafter, also referred to as polymer A solution phase) and a solution phase mainly composed of the polymer (B) (polyvinyl alcohol group) (hereinafter, also referred to as polymer B solution phase), after an emulsion is formed at a temperature of 100° C. or higher, the polymer (A) is precipitated by bringing a poor solvent for the polymer (A) into contact with the emulsion.

In the above description, "a system in which a polymer (A), a polymer (B) and an organic solvent are dissolved and mixed together and which can cause phase separation into two phases of a solution phase mainly composed of the polymer (A) and a solution phase mainly composed of the polymer (B)" means a system in which, when a polymer (A), a polymer (B) and an organic solvent are mixed together, the mixture is separated into two phases of a solution phase mainly composed of the polymer (A) and a solution phase mainly composed of the polymer (B).

By using such a system causing phase separation, an emulsion can be formed by carrying out mixing under conditions to maintain phase separation, followed by emulsification.

In the above-described system, the possibility of dissolution of the polymer is checked by determining whether the polymer dissolves in the organic solvent up to more than 1 mass % at a temperature at which our microparticles and processes are carried out, that is, at a temperature at which the polymer A and the polymer B are dissolved and mixed to form two separate phases.

In this emulsion, the polymer A solution phase acts as dispersed phase and the polymer B solution phase acts as continuous phase. By bringing a poor solvent for the polymer A into contact with this emulsion, the polymer A is precipitated from the polymer A solution phase in the emulsion to obtain polymer microparticles composed of the polymer A.

In the production process, as long as the polymer microparticles can be obtained by using the polymer A, polymer B, organic solvent to dissolve them, and poor solvent for the polymer A, the combination thereof is not particularly restricted. However, the polymer A indicates a high molecular weight polymer, which is preferably a synthetic polymer that does not naturally exist, more preferably a non-water-soluble polymer, and as its example, a thermoplastic or thermosetting resin can be exemplified.

Concretely, as the thermoplastic resins, vinyl-group polymer, polyester, polyamide, polyarylene ether, polyarylene sulfide, polyethersulfone, polysulfone, polyether ketone, polyether ether ketone, polyurethane, polycarbonate, polyamide-imide, polyimide, polyetherimide, polyacetal, silicone, and copolymers thereof can be exemplified.

A vinyl-group polymer is produced by carrying out homopolymerization or copolymerization of vinyl-group monomers. Such a vinyl-group polymer may be a rubber-containing graft copolymer produced by graft copolymerization of vinyl-group monomers (may be selected from aromatic vinyl-group monomers such as styrene, vinyl cyanide monomers, other vinyl-group monomers and the like) or their mixture under the existence of a rubbery polymer, or a vinyl-group polymer containing a rubbery polymer such as a composition of the former and a vinyl-group polymer.

As such vinyl-group polymers, concretely, polyethylene, polypropylene, polystyrene, poly(acrylonitrile-styrene-butadiene) resin (ABS), polytetrafluoroethylene (PTFE), polyacrylonitrile, polyacrylic amide, polyvinyl acetate, polybutyl acrylate, polymethyl methacrylate, cyclic polyolefin and the like can be exemplified.

In case where the process is applied to a vinyl-group polymer, it becomes possible to produce particles with a narrow particle diameter distribution in a size range, such as an average particle diameter of 10 μm or more, preferably 20 μm or more, where it has been difficult to produce such particles with a narrow particle diameter distribution by emulsion polymerization. Further, the upper limit for this is usually 1,000 μm or less.

In particular, applying the process to the above-described vinyl-group polymer containing the rubbery polymer is very preferable because polymer microparticles of a daughter particle dispersed structure in which a graft copolymer (daughter particles) is dispersed in a vinyl-group polymer matrix, can be produced with a narrow particle diameter distribution. As concrete examples, a poly(acrylonitrile-styrene-butadiene) resin (ABS resin) dispersed with a rubber containing graft copolymer in a poly(acrylonitrile-styrene) resin matrix.

As the polyester, a polymer composed, as structural units, of a multivalent carboxylic acid or its ester-forming derivative and a polyhydric alcohol or its ester-forming derivative, a polymer composed, as a structural unit, of a hydroxycarboxylic acid or lactone, or a copolymer thereof can be exemplified.

As concrete examples of the polyester, polyethylene terephthalate, polypropylene terephthalate, polybutylene terephthalate, polycyclohexane dimethylene terephthalate, poly hexylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, polybutylene terephthalate/decane dicarboxylate, polyethylene terephthalate/cyclohexane dimethylene terephthalate, polyether ester (polyethylene terephthalate/polyethylene glycol, polypropylene terephthalate/polyethylene glycol, polybutylene terephthalate/polyethylene glycol, polyethylene terephthalate/polytetramethylene glycol, polypropylene terephthalate/polytetramethylene glycol, polybutylene terephthalate/polytetramethylene glycol, polyethylene terephthalate/isophthalate/polytetramethylene glycol, polypropylene terephthalate/isophthalate/polytetramethylene glycol, polybutylene terephthalate/isophthalate/polytetramethylene glycol and the like) polyethylene terephthalate/succinate, polypropylene terephthalate/succinate, polybutylene terephthalate/succinate, polyethylene terephthalate/adipate, polypropylene terephthalate/adipate, polybutylene terephthalate/adipate, polyethylene terephthalate/sebacate, polypropylene terephthalate/sebacate, polybutylene terephthalate/sebacate, polyethylene terephthalate/isophthalate/adipate, polypropylene terephthalate/isophthalate/adipate, polybutylene terephthalate/isophthalate/succinate, polybutylene terephthalate/isophthalate/adipate, polybutylene terephthalate/isophthalate/sebacate, bisphenol A/terephthalic acid, bisphenol A/isophthalic acid, bisphenol A/terephthalic acid/isophthalic acid, polyglycolic acid, polylactic acid, poly(3-hydroxy butanic acid), poly(3-hydroxy valeric acid), polybutyrolactone, polycaprolactone and the like can be exemplified.

Among the above-described polyesters, a polyether ester, which is a thermoplastic resin having an ether bond, is preferably used, and as such a polyester, it is possible to use a so-called "polyester elastomer" such as "Hytrel" (registered trademark) (supplied by Du Pont-Toray Co., Ltd., and Du Pont Co., Ltd.) which is sold on the market.

As the polyamide, exemplified is a polyamide produced through condensation polymerization of a lactam with a three- or more membered ring, polymerizable aminocarboxylic acid, dibasic acid and diamine or a salt thereof, or a mixture thereof.

As examples of such polyamides, crystalline poliamides such as polycaproamide (nylon 6), polyhexamethylene adipamide (nylon 66), polypentamethylene adipamide (nylon 56), polytetramethylene sebacamide (nylon 410), polypentamethylene sebacamide (nylon 510), polyhexamethylene sebacamide (nylon 610), polydecamethylene sebacamide (nylon 1010), polyundeca amide (nylon 11), polydodeca amide (nylon 12), polypentamethylene terephthalamide (nylon 5T), polyhexamethylene terephthalamide (nylon 6T), polydecamethylene terephthalamide (nylon 10T), and a copolymer of 4,4'-diaminodicyclohexyl methane and decane dicarboxylic acid (such as "TROGAMID" (registered trademark) CX7323, supplied by Daicel-Evonik Ltd.) are exemplified, and as amorphous polyamides, a copolymer of 3,3'-dimethyl-4,4'-diaminodicyclohexyl methane, isophthalic acid, and 12-aminododecanoic acid (such as "Grilamide" (registered trademark) TR55, supplied by EMS Werke, Inc.), a copolymer of 3,3'-dimethyl-4,4'-diaminodicyclohexyl methane and decane dicarboxylic acid (such as "Grilamide" (registered trademark) TR90, supplied by EMS Werke, Inc.), and a mixture of a copolymer of 3,3'-dimethyl-4,4'-diaminodicyclohexyl methane, isophthalic acid, and 12-amino dodecanoic acid and a copolymer of 3,3'-dimethyl-4,4'-diaminodicyclohexyl methane and decane dicarboxylic acid (such as "Grilamide" (registered trademark) TR70LX, supplied by EMS Werke, Inc.) are exemplified.

A polyarylene ether is a polymer comprising aryl groups connected through ether bonds, and may have a structure represented by the following Formula (1):

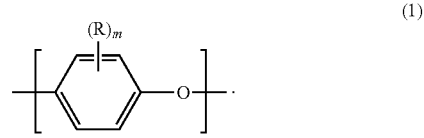

The aromatic ring in them may or may not contain a substituent group R, and the number of the substituent groups, m, is not less than 1 and not more than 4. The preferable substituent groups include saturated hydrocarbon groups with a carbon number of 1 to 6 such as methyl group, ethyl group, and propyl group; unsaturated hydrocarbon groups such as vinyl group and allyl group; halogen groups such as fluorine atom, chlorine atom, and bromine atom; and others such as amino group, hydroxyl group, thiol group, carboxyl group, and carboxy aliphatic hydrocarbon ester group.

As a concrete example of the polyarylene ether, poly(2,6-dimethyl phenylene ether) is exemplified.

A polyarylene sulfide is a polymer comprising aryl groups connected through sulfide bonds and may have a structure represented by the following Formula (2):

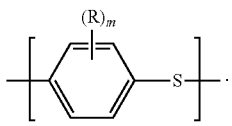

(2)

The aromatic ring in them may or may not contain a substituent group R, and the number of the substituent groups, m, is not less than 1 and not more than 4. As the substituent groups, saturated hydrocarbon groups such as methyl group, ethyl group, and propyl group; unsaturated hydrocarbon groups such as vinyl group and allyl group; halogen groups such as fluorine atom, chlorine atom, and bromine atom; and others such as amino group, hydroxyl group, thiol group, carboxyl group, and carboxy aliphatic hydrocarbon ester group, are exemplified. It is also possible that a methaphenylene unit, an ortho phenylene unit, and a copolymer thereof may be used instead of the paraphenylene sulfide unit in Formula (2).

As a concrete example of the polyarylene sulfide, a polyphenylene sulfide is exemplified.

The polysulfone is preferably one having a structure represented by the following Formula (3):

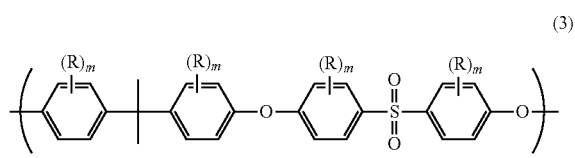

(3)

R's in the formula represent an alkyl group with a carbon number of 1 to 6 or an aryl group with a carbon number of 6 to 8, and m denotes an integer of 0 to 4.

The polyether ketone is a polymer with an ether bond and a carbonyl group. Concretely, it preferably has a structure represented by the following Formula (4):

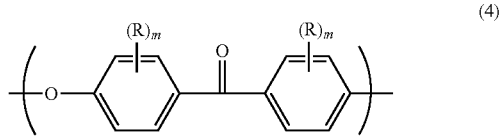

(4)

R's in the formula represent an alkyl group with a carbon number of 1 to 6 or an aryl group with a carbon number of 6 to 8, and m denotes an integer of 0 to 4.

A polyetherketone having a structure represented by the following Formula (5) is called, in particular, as polyetheretherketone:

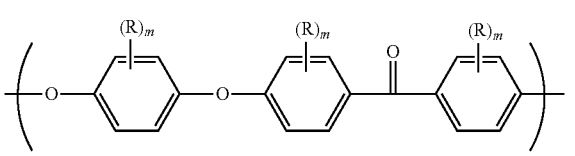

(5)

R's in the formula represent an alkyl group with a carbon number of 1 to 6 or an aryl group with a carbon number of 6 to 8, and m denotes an integer of 0 to 4.

The polycarbonate is a polymer comprising a carbonate group and preferably has a structure represented by the following Formula (6):

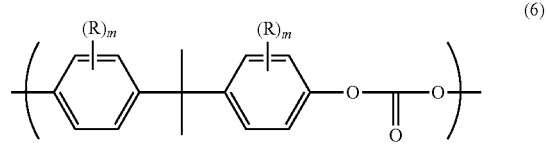

(6)

R's in the formula represent an alkyl group with a carbon number of 1 to 6 or an aryl group with a carbon number of 6 to 12, and m denotes an integer of 0 to 4.

As concrete examples, exemplified are a polymer produced from bisphenol A through condensation polymerization of carbonate bonds, a polymer produced from naphthalene diol through condensation polymerization of carbonate bonds, a polymer produced from biphenylene diol through condensation polymerization of carbonate bonds, a polymer produced from biphenylene sulfide diol through condensation polymerization of carbonate bonds and the like, each free of Rm substituent groups. Further, it may be one produced through copolymerization of a polycarbonate and the aforementioned polyester.

The polyamide-imide is a polymer comprising an imide bond and an amide bond.

The polyimide is a polymer comprising an imide bond. For this case, in particular, it is preferably a thermoplastic polyimide, and concretely, a condensation polymer of 1,2,4,5-benzene tetracarboxylic anhydride and 4,4'-bis(3-aminophenyloxy) biphenyl or a condensation polymer of 3,3',4,4'-biphenyl tetracarboxylic anhydride and 1,3-bis(4-aminophenyloxy)benzene can be exemplified.

The polyetherimide is a polymer comprising an ether bond and an imide bond in the molecule, and concretely, a polymer produced by condensation of 4,4'-[isopropylidene bis(p-phenyleneoxy)]diphthalic dianhydride and methaphenylene diamine and the like can be exemplified.

The polymer A may be a thermosetting resin, and concretely, epoxy resin, benzoxazine resin, vinyl ester resin, unsaturated polyester resin, urethane resin, phenol resin, melamine resin, maleimide resin, cyanate resin, urea resin and the like can be exemplified.

Among these, an epoxy resin is preferably used because of its high heat resistance and adhesiveness. As the epoxy resins, for instance, glycidyl ether type epoxy resins produced from a compound comprising a hydroxyl group in the molecule and epichlorohydrin, glycidyl amine type epoxy resins produced from a compound comprising an amino group in the molecule and epichlorohydrin, glycidyl ester type epoxy resins produced from a compound comprising a carboxyl group in the molecule and epichlorohydrin, alicyclic epoxy resins produced by oxidizing a compound comprising a double bond in the molecule, epoxy resins comprising two or more of these different groups coexisting in the molecule and the like can be used.

Further, a curing agent may be used in combination with these epoxy resins. The curing agents that can be used in combination with an epoxy resin include, for instance, aromatic amine, aliphatic amine, polyamide amine, carboxylic anhydride, Lewis acid complex, acidic curing catalyst, basic curing catalyst and the like.

The preferable resins to be used as the polymer A are polymers high in heat resistance, and resins whose glass transition temperatures or melting points exceed 100° C.

As concrete examples, polyethersulfone, polycarbonate, polyamide, polyphenylene ether, polyetherimide, polyphenylene sulfide, polyolefin, polysulfone, polyester, amorphous polyarylate, polyamide-imide, polyether ketone, polyether ether ketone, epoxy resin and the like can be exemplified, and among these, crystalline thermoplastic resins having a melting point of 100° C. or higher are preferred, one having a higher crystallinity is more preferred. As the resin having a high crystallinity, preferably exemplified is a crystalline thermoplastic resin having an amide unit, an ester unit, a sulfide unit or a carbonate unit in its molecular main chain structure. In particular, polyamide, polyester and polyphenylene sulfide can be preferably exemplified. The crystalline thermoplastic resin is advantageous to make our particles.

The above-described resins for the polymer A may be used singly or in combination.

These preferable resins are excellent in thermal and/or mechanical properties. In case where particles are made by our process using these resins as the raw material, the microparticles obtained have a narrow particle diameter distribution and are excellent in handling ability, and therefore, high-quality polymer microparticles can be obtained, and they are preferable in that the microparticles can be applied to use where the conventional ones have not been able to be used.

With respect to the molecular weight, the polymer A preferably has a weight average molecular weight of 1,000 to 100,000,000, more preferably 1,000 to 10,000,000, further more preferably 5,000 to 1,000,000, and it is particularly preferably in the range of 10,000 to 500,000, and most preferably in the range of 10,000 to 100,000.

The weight average molecular weight as referred to here is the weight average molecular weight value measured by gel permeation chromatography (GPC) using dimethyl formamide as solvent and converted in terms of polystyrene.

Tetrahydrofuran is used if dimethyl formamide does not serve for the measurement, and hexafluoroisopropanol is used if measurement is still impossible. If it is still impossible to make measurements with hexafluoroisopropanol, 2-chloronaphthalene is used for the measurement.

The polymer A is preferably a polymer that does not dissolve in the poor solvent used because the most important step is the precipitation of microparticles achieved by bringing it into contact with the poor solvent. Preferably it is a polymer which does not dissolve in the poor solvents described later, and in particular, it is preferably a non-water-soluble polymer.

The non-water-soluble polymer means a polymer with a water solubility of 1 mass % or less, preferably 0.5 mass % or less, and more preferably 0.1 mass % or less.

The crystalline thermoplastic polymer means one that has a crystalline part among a crystalline phase and an amorphous phase in a polymer, and it can be determined by differential scanning calorimetry (DSC). Namely, it means one that can be measured with a heat of fusion in the DSC measurement. With respect to the value of the heat of fusion, the polymer has 1 J/g or more, preferably 2 J/g or more, more preferably 5 J/g or more, further preferably 10 J/g or more. In this DSC measurement, the polymer is once heated from 30° C. up to a temperature higher by 30° C. than the melting point of the polymer at a heating rate of 20° C./min, held there for 1 minute, cooled down to 0° C. at a cooling rate of 20° C./min, held there for 1 minute, and heated again at 20° C./min to determine the heat of fusion.

As the polymer B, it is preferred that its SP value is 20 $(J/cm^3)^{1/2}$ or higher.

In case of such a polymer B, the phase separation condition of polymer B phase and polymer A phase is easily formed, and at the time of the precipitation due to the poor solvent described later, because the precipitation of polymer B is hardly caused, it does not affect the formation of particles.

The SP value of polymer B is preferably 21 $(J/cm^3)^{1/2}$ or higher, more preferably 23 $(J/cm^3)^{1/2}$ or higher, further preferably 25 $(J/cm^3)^{1/2}$ or higher, particularly preferably 28 $(J/cm^3)^{1/2}$ or higher, and extremely preferably 30 $(J/cm^3)^{1/2}$ or higher.

Although there is not a specific limitation as long as both polymer A and polymer B can dissolve in the organic solvent, the upper limit of the difference between SP values thereof is preferably 20 $(J/cm^3)^{1/2}$ or less, more preferably 15 $(J/cm^3)^{1/2}$ or less, and further preferably 10 $(J/cm^3)^{1/2}$ or less.

The SP value referred to here is a value calculated according to Fedor's estimation method based on the coagulation energy density and the molar molecular volume (hereinafter, also referred to as calculation method) ("SP value, base, application and calculation method", Hideki Yamamoto, published by Johokiko Co., Ltd., Mar. 31, 2005).

If the calculation cannot be performed by this method, the SP value is calculated from measurements based on whether it is dissolved in a solvent with a known solubility parameter (hereinafter, also referred to as measurement method), and the calculated value is used instead ("Polymer Handbook Fourth Edition", J. Brand, published by Wiley, 1998).

If the calculation cannot be performed by this method, the SP value is calculated from measurements based on whether it is dissolved in a solvent with a known solubility parameter (hereinafter, also referred to as measurement method), and the calculated value is used instead ("Polymer Handbook Fourth Edition", J. Brand, published by Wiley, 1998).

In particular, the polymer B is preferably high in affinity with the poor solvent described later, and the index of the affinity can be determined by the solubility into water. With respect to the solubility into water of the polymer (B), when solubility of 1 g per 100 g of water at 25° C. is defined as 1 (g/100 g), it is preferably 1 (g/100 g) or greater, more preferably 2 (g/100 g) or greater, further preferably 5 (g/100 g) or greater, particularly preferably 10 (g/100 g) or greater, and remarkably preferably 15 (g/100 g) or greater. If it is within this range, the affinity with the poor solvent described later is high, and it functions advantageously in our process of producing polymer microparticles.

As the preferred concrete kinds of polymers for the polymer B, polymers having a hydroxyl group, an ether group, an amide group or a carboxyl group in its molecular structure are preferred.

When the polymer B is concretely exemplified, as the polymer having a hydroxyl group in its molecular structure, exemplified are polyvinyl alcohol groups (such as a fully saponified or a partially saponified poly(vinyl alcohol), poly(vinyl alcohol-ethylene) copolymer groups (such as a fully saponified or a partially saponified poly(vinyl alcohol-ethylene) copolymer); poly(para-vinyl phenol); disaccharides such as maltose, cellobiose, lactose, and sucrose; celluloses and derivatives thereof (such as hydroxyalkyl cellulose (hydroxyethyl cellulose, hydroxypropyl cellulose, ethylhydroxyethyl cellulose and the like), cellulose, methyl cellulose, ethyl cellulose, carboxymethylethyl cellulose, carboxymethyl cellulose, carboxymethyl cellulose sodium, cellulose ester, chitosan and the like); polysaccharides and derivatives thereof such as amylase and derivatives thereof, starch and derivatives thereof, dextrin, cyclodextrin, and sodium alginate and derivatives thereof; and others such as gelatin, casein, collagen, albumin, fibroin, keratin, fibrin, carrageenan, chondroitin sulfate, gum arabic, agar, and protein. As the polymer having an ether group in its molecular structure, exemplified are polyalkylene glycol, sucrose fatty acid ester, poly(oxyethylene fatty acid ester), poly(oxyethylene lauric fatty acid ester), poly(oxyethylene glycol mono-fatty acid ester), poly(oxyethylene alkyl phenyl ether), poly(oxyalkyl ether), polyvinyl ether, polyvinyl formal and the like. As the polymer having an amide group in its molecular structure, exemplified are polyvinyl pyrrolidone, aminopoly(acrylic amide), poly(acrylic amide), poly(methacrylic amide), water-soluble nylon such as "AQ nylon" (registered trademark) (A-90, P-70, P-95, T-70; supplied by Toray Industries, Inc.). As the polymer having a carboxyl group in its molecular structure, exemplified are polyacrylic acid, sodium polyacrylate, polymethacrylic acid, sodium polymethacrylate. As others, exemplified are synthetic resins such as polystyrene sulfonic acid, sodium polystyrene sulfonate, polyvinyl pyrrolidinium chloride, poly(styrene-maleic acid) copolymer, polyallyl amine, polyvinyl ether, polyvinyl formal, polyacrylamide, polymethacrylamide, polyoxyethylene amine, poly(oxyethylene amine), poly(vinyl pyridine), polyaminosulfone, and polyethylene imine.

They are preferably polyvinyl alcohol groups (such as a fully saponified or a partially saponified poly(vinyl alcohol), or poly(vinyl alcohol-ethylene) copolymer groups such as a fully saponified or a partially saponified poly(vinyl alcohol-ethylene) copolymer), cellulose derivatives (such as carboxymethylethyl cellulose, hydroxyalkyl cellulose (hydroxyethyl cellulose, hydroxypropyl cellulose, ethylhydroxyethyl cellulose), methyl cellulose, ethyl cellulose, carboxymethylethyl cellulose, carboxymethyl cellulose, carboxymethyl cellulose sodium, cellulose ester and the like), polyalkylene glycol, sucrose fatty acid ester, polyvinyl pyrrolidone, water-soluble nylon, polyacrylic acid, and polymethacrylic acid. More preferably they are polyvinyl alcohol groups (such as a fully saponified or a partially saponified poly(vinyl alcohol), or poly(vinyl alcohol-ethylene) copolymer groups such as a fully saponified or a partially saponified poly(vinyl alcohol-ethylene) copolymer), cellulose derivatives (such as carboxymethylethyl cellulose, hydroxyalkyl cellulose (hydroxyethyl cellulose, hydroxypropyl cellulose, ethylhydroxyethyl cellulose), methyl cellulose, ethyl cellulose, carboxymethylethyl cellulose, carboxymethyl cellulose, carboxymethyl cellulose sodium, cellulose ester and the like), polyalkylene glycol, polyvinyl pyrrolidone, water-soluble nylon, and polyacrylic acid. Particularly preferably they are polyvinyl alcohol groups such as a fully saponified or a partially saponified poly(vinyl alcohol), hydroxyalkyl cellulose such as hydroxyethyl cellulose, hydroxypropyl cellulose and the like, polyalkylene glycol, polyvinyl pyrrolidone, water-soluble nylon, and polyacrylic acid.

As the polymer B, remarkably preferably polyvinyl alcohol groups are used. In more detail, the polyvinyl alcohol group means a polymer having a structure represented the following Formula (7) in its molecule:

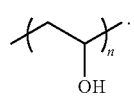

(7)

It may be a poly(vinyl alcohol) (a fully saponified or a partially saponified poly(vinyl alcohol)). There is also a case where it is called merely as a polyvinyl alcohol. Although it may be a poly(vinyl alcohol-ethylene) (a fully saponified or a partially saponified poly(vinyl alcohol-ethylene)), a polyvinyl alcohol is preferred from the viewpoint of solubility.

The molecular weight of the polymer B is preferably in the range of 1,000 to 100,000,000 as weight average molecular weight, more preferably in the range of 1,000 to 10,000,000, further preferably in the range of 5,000 to 1,000,000, particularly preferably in the range of 10,000 to 500,000, and most preferably in the range of 10,000 to 100,000.

The weight average molecular weight as referred to here is the weight average molecular weight value measured by gel permeation chromatography (GPC) using water as solvent and converted in terms of polyethylene glycol.

Dimethyl formamide is used if water does not serve for the measurement, and tetrahydrofuran is used if measurement is still impossible. If it is still impossible to make measurements, then hexafluoroisopropanol is used.

With respect to the polyvinyl alcohol group, it is general to produce polyvinyl alcohol by polymerizing vinyl acetate as a raw material and thereafter hydrolyzing it under an alkali condition, and therein usually sodium acetate partially remains as impurities, which is contained around 0.2 mass % even in a product on the market.

We found that the above-described sodium acetate contained in the polyvinyl alcohol influences to some extent, and when an emulsion is formed by solution and mixing into polymer A and an organic solvent, if the temperature is 100° C. or higher, the microparticles are colored, or the recycling property deteriorates by deterioration of the polyvinyl alcohol.

Namely, to stabilize the polyvinyl alcohol group which is polymer B even under a condition for producing microparticles at 100° C. or higher, it is preferred to the amount of sodium acetate existed in the system for forming an emulsion. As a method therefor, it is preferred to use polyvinyl alcohol with a small content of sodium acetate as the polyvinyl alcohol group.

In this case, the amount of sodium acetate in the used polyvinyl alcohol relative to 100 parts by mass of polyvinyl alcohol is 0.1 part by mass or less, preferably 0.05 part by mass or less, more preferably 0.01 part by mass or less.

By controlling it in this range, even if the polymer is made into microparticles under a high-temperature condition, it can be suppressed that the polyvinyl alcohol group is modified originating from decomposition or cross-linking, and making the polymer into microparticles under a high-temperature condition can be stabilized.

Further, a preferable lower limit is 0 part by mass.

To obtain polyvinyl alcohol group little in content of sodium acetate, for example, exemplified are a method for cleaning it by an organic solvent such as methanol or ethanol, a reprecipitaion method for producing it by precipitating it in a poor solvent for polyvinyl alcohol group after dissolving it in water and the like, a ultrafiltration method, a method for removing the sodium acetate by ion exchange resin, ion exchange carrier or the like.

Further, as another method of suppressing the influence due to sodium acetate when an emulsion is formed, a method of adding an acid compound to the system to form the emulsion can be exemplified. By this, a condition where sodium acetate substantially is not contained can be realized.

As the acid compounds, exemplified are aliphatic carboxylic acids such as formic acid, acetic acid, valeric acid, butyric acid, hexanoic acid, heptanoic acid, octanoic acid, acrylic acid, methacrylic acid, crotonic acid, oxalic acid, malonic acid, fumaric acid, maleic acid, glutaric acid, adipic acid, sebacic acid, pyruvic acid, succinic acid and polyacrylic acid, carboxylic acids having a hydroxyl group such as lactic acid, glycolic acid, L-ascorbic acid, erythorbic acid, malic acid, shikimic acid, citric acid, hydrosuccinic acid and tartaric acid, aromatic carboxylic acids such as benzoic acid, 2-fluorobenzoic acid and regioisomers thereof, 2-chlorobenzoic acid and regioisomers thereof, 2-bromobenzoic acid and regioisomers thereof, 2-nitro benzoic acid and regioisomers thereof, 2-toluic acid and regioisomers thereof, phenoxyacetic acid, cinnamic acid, phenyl malonic acid, phthalic acid, terephthalic acid and salicylic acid, amino acids such as glycine, alanine, valine, leucine, isoleucine, serine, threonine, proline, lysin, aspartic acid, glutaminic acid, cysteine, methionine, phenylalanine, tyrosine, histidine, asparagine, glutamine, arginine, tryptophan, ornithine and sarcosine, organic sulfonic acids such as methane sulfonic acid, benzene sulfonic acid, p-toluene sulfonic acid and regioisomers thereof, p-hydroxybenzene sulfonic acid and regioisomers thereof, organic phosphorus acids such as phenyl phosphonic acid, diphenyl phosphinic acid, diphenyl phosphate and 1-naphthyl phosphate, salts consisting of a strong acid and a weak base such as magnesium sulfate, magnesium chloride, ammonium chloride and ammonium sulfate, and inorganic acids such as hydrochloric acid, sulfuric acid, phosphoric acid, nitric acid, pyrophosphoric acid and tripolyphosphoric acid. Those can be used either alone or in combination.

These acid compounds may be added at any step in the production steps described later as long as it is a step before the heating for forming an emulsion is started, and further, they may be used by being added into a raw material in advance.

In that step, with respect to the content of the acid compound, the mole rate of the acid functional group relative to sodium acetate contained in the used polyvinyl alcohol group is preferably in the range of 0.1 to 10 times mole, more preferably in the range of 0.2 to 8 times mole, and further preferably in the range of 0.3 to 5 times mole.

With respect to the content of the acid compound relative to sodium acetate contained in the used polyvinyl alcohol group, in case where the mole rate of the acid functional group is too small, the cross-linking of the polyvinyl alcohol group proceeds, and the particle diameter control ability at the process of making microparticles tends to deteriorate. Further, when the polyvinyl alcohol group is recycled, the particle diameter control ability at the second use or after tends to deteriorate. Furthermore, by color tone change presumed to be caused by oxidation of the polyvinyl alcohol group, a color change of microparticles tends to occur. Further, in case where the mole rate of the acid functional group is too great, by the influence due to acid, oxidation, decomposition or cross-linking of the polyvinyl alcohol group tends to occur.

As the acid compound used in the process, an acid compound having a first dissociation index (pKa1) of 4.5 or less is preferred.

Because the process is carried out at a high temperature of 100° C. or higher, an acid compound having a thermally resistant temperature of 100° C. or higher is preferred. The thermally resistant temperature denotes a decomposition temperature of the acid compound.

Specifically, as examples having a thermally resistant temperature of 100° C. or higher and a (pKa1) of 4.5 or less can be used. In particular, L-ascorbic acid, erythorbic acid, lactic acid, malic acid, fumaric acid, phthalic acid, tartaric acid, formic acid, citric acid, glycolic acid, salicylic acid, maleic acid, malonic acid, glutaric acid, oxalic acid, adipic acid, succinic acid, hydrosuccinic acid, polyacrylic acid, amino acids such as glutaminic acid, aspartic acid, arginine, ornithine, sarcosine, cysteine, serine and tyrosine, and inorganic acids such as hydrochloric acid, sulfuric acid, phosphoric acid, nitric acid, pyrophosphoric acid and tripolyphosphoric acid can be used. In particular, citric acid, tartaric acid, malonic acid, oxalic acid, adipic acid, maleic acid, malic acid, phthalic acid, succinic acid and polyacrylic acid can be preferably used.

pKa is acid dissociation index at 25° C., and denotes a logarithm value of an inverse number of a dissociation constant of an acid compound in an aqueous solution. The pKa value of an acid compound can be referred to by Chemical Handbook (Third revision, Chemical Handbook, Basic version, edited by Japanese Chemical Society, published by Maruzen Co., Ltd. (1984)) or the like.

For the pKa value, one described in the Chemical Handbook is preferably used from the viewpoint of convenience.

The organic solvents that dissolve the polymer A and the polymer B are those organic solvents that can dissolve the polymer A and the polymer B to be used, and appropriate ones are selected in accordance with the kind of each polymer.

As concrete examples thereof, exemplified are aliphatic hydrocarbon solvents such as pentane, hexane, heptane, octane, nonane, n-decane, n-dodecane, n-tridecane, cyclohexane, and cyclopentane; aromatic hydrocarbon solvents such as benzene, toluene and xylene; ester solvents such as ethyl acetate and methyl acetate; halogenated hydrocarbon solvents such as chloroform, bromoform, methylene chloride, 1,2-dichloroethane, 1,1,1-trichloroethane, chlorobenzene and 2,6-dichlorotoluene; ketone solvents such as acetone, methyl ethyl ketone, methyl isobutyl ketone and methyl butyl ketone; alcohol solvents such as methanol, ethanol, 1-propanol and 2-propanol; aprotic polar solvents such as N-methyl-2-pyrrolidone, dimethyl sulfoxide, N,N-dimethyl formamide, N,N-dimethyl acetamide, propylene carbonate, trimethyl phosphate, 1,3-dimethyl-2-imidazolidinone and sulfolane; carboxylic acid solvents such as formic acid, acetic acid, propionic acid, butyric acid and lactic acid; ether solvents such as anisole, diethyl ether, tetrahydrofuran, diisopropyl ether, dioxane, diglyme and dimethoxy ethane; and mixtures thereof. The preferable ones are aromatic hydrocarbon solvents, aliphatic hydrocarbon solvents, halogenated hydrocarbon solvents, alcohol solvents, ether solvents, aprotic polar solvents and carboxylic acid solvents.

More preferable solvents are ones having an SP value of 20 $(J/cm^3)^{1/2}$ or higher. Where, the SP value means a value described in pages 688-701 of ("Polymer Handbook Fourth Edition", J. Brand, published by Wiley, 1998).

If not described there, the SP value is calculated based on Fedor's estimation method. This is calculated based on the coagulation energy density and the molar molecular volume (hereinafter, also referred to as calculation method of solvent SP value) ("SP value, base, application and calculation method", Hideki Yamamoto, published by Johokiko Co., Ltd., Mar. 31, 2005).

Specifically, preferable ones are alcohol solvents, aprotic polar solvents and carboxylic acid solvents which are water-soluble solvents, and remarkably preferable ones are aprotic polar solvents and carboxylic acid solvents.

Because forming the emulsion is carried out at a high temperature of 100° C. or higher, also for the solvent therefor, one having a thermal resistance of 100° C. or higher is preferred, and in particular, one having a boiling point of 100° C. or higher at a normal pressure (100 kPa) is preferred. Further, in case where a solvent having a boiling point lower than 100° C. at a normal pressure is used, it is possible to use it by pressurizing it in a pressure-resistant vessel. In consideration of such circumstances and from the points of view that getting is easy, that range of application to polymer A is wide and wide range of polymers can be dissolved, and that uniform mixing can be expected with a solvent which is preferably used as a poor solvent such as water or alcohol-group solvent described later, most preferably the above-described solvents are N-methyl-2-pyrrolidone, dimethyl sulfoxide, N,N-dimethyl formamide, N,N-dimethyl acetamide and 1,3-dimethyl-2-imidazolidinone.

Although two or more these organic solvent may be used separately or as a mixture, the use of a single organic solvent is preferable because they can serve to produce particles with a relatively small particle diameter and with a narrow particle diameter distribution, avoid troublesome separation operations for recycling of used solvents, and decrease the process load for production. Further, it is more preferable to use a single organic solvent that dissolves both the polymer A and the polymer B.

The poor solvent for the polymer A is a solvent that does not dissolve the polymer. A. The expression "does not dissolve the solvent" here means that the solubility of the polymer A in the poor solvent is 1 mass % or less, preferably 0.5 mass % or less, and more preferably 0.1 mass % or less.

Although the production process uses a poor solvent for the polymer A, such a solvent is preferably one which is a poor solvent for the polymer A and at the same time a solvent that dissolves the polymer B. By this, polymer microparticles composed of the polymer A can be efficiently precipitated. Further, it is preferable that the solvent used to dissolve both the polymer A and the polymer B can mix uniformly with the poor solvent for the polymer A.

Although the poor solvent variously changes depending upon the type of the polymer A used and desirably upon the types of both the polymers A and B, as the concrete example, exemplified is at least one solvent selected from the group consisting of aliphatic hydrocarbon solvents such as pentane, hexane, heptane, octane, nonane, n-decane, n-dodecane, n-tridecane, cyclohexane and cyclopentane; aromatic hydrocarbon solvents such as benzene, toluene and xylene; ester solvents such as ethyl acetate and methyl acetate; halogenated hydrocarbon solvents such as chloroform, bromoform, methylene chloride, 1,2-dichloroethane, 1,1,1-trichloroethane, chlorobenzene and 2,6-dichlorotoluene; ketone solvents such as acetone, methyl ethyl ketone, methyl isobutyl ketone and methyl butyl ketone; alcohol solvents such as methanol, ethanol, 1-propanol and 2-propanol; aprotic polar solvents such as dimethyl sulfoxide, N,N-dimethyl formamide, N,N-dimethyl acetamide, trimethyl phosphate, N-methyl-2-pyrrolidone, 1,3-dimethyl-2-imidazolidinone and sulfolane; carboxylic acid solvents such as formic acid, acetic acid, propionic acid, butyric acid and lactic acid; ether solvents such as anisole, diethyl ether, tetrahydrofuran, diisopropyl ether, dioxane, diglyme and dimethoxy ethane; and water.

From the viewpoint of efficiently making the polymer A into particles, the preferable ones are aromatic hydrocarbon solvents, aliphatic hydrocarbon solvents, alcohol solvents, ether solvents and water, the most preferable ones are alcohol solvents and water, and particularly preferable one is water.

Since forming the emulsion is carried out at a temperature of 100° C. or higher, in case where the process is carried out using a solvent having a boiling point lower than 100° C., or in case where, even if the boiling point is 100° C. or higher, the forming of the emulsion is carried out at a temperature of the boiling point or higher, it can be used in a pressure-resistant vessel at a pressurized condition.

It is possible to efficiently precipitate the polymer A and obtain microparticles by adequately selecting and combining the polymer A, the polymer B, organic solvents to dissolve them, and a poor solvent for the polymer A.

The mixed liquid dissolved with the polymers A and B and an organic solvent that dissolve them must be caused to be phase separated into two phases of a solution phase mainly composed of the polymer A and a solution phase mainly composed of the polymer B. In this step, the organic solvent for the solution phase mainly composed of the polymer A and the organic solvent mainly containing the polymer B may be identical with or different from each other, but it is preferable that these solvents are substantially same solvents.

The conditions for formation of the two separate phase state vary depending upon the types of the polymers A and B and the molecular weights of the polymers A and B, the type of the organic solvent, and the concentrations of the polymers A and B, and the temperature and pressure at which the process is to be carried out.

To obtain conditions where phase separation easily takes place, it is preferred that the solubility parameter (hereinafter, also referred to as SP value) of the polymer A and that of the polymer B are largely different from each other.

The difference between both SP values is preferably 1 $(\text{J/cm}^3)^{1/2}$ or greater, more preferably 2 $(\text{J/cm}^3)^{1/2}$ or greater, further preferably 3 $(\text{J/cm}^3)^{1/2}$ or greater, particularly preferably 5 $(\text{J/cm}^3)^{1/2}$ or greater, and extremely preferably 8 $(\text{J/cm}^3)^{1/2}$ or greater. If the SP values satisfies this range, phase separation can be easily achieved.

There are no specific limitations on the maximum difference between the SP values as long as both the polymer A and the polymer B can dissolve in the organic solvent, but it is preferable that the maximum difference is 20 $(\text{J/cm}^3)^{1/2}$ or less, more preferably 15 $(\text{J/cm}^3)^{1/2}$ or less, and further preferably 10 $(\text{J/cm}^3)^{1/2}$ or less.

The SP value referred to here is a value calculated according to Fedor's estimation method based on the coagulation energy density and the molar molecular volume (hereinafter, also referred to as calculation method) ("SP value, base, application and calculation method", Hideki Yamamoto, published by Johokiko Co., Ltd., Mar. 31, 2005).

If the calculation cannot be performed by this method, the SP value is calculated from measurements based on whether it is dissolved in a solvent with a known solubility parameter (hereinafter, also referred to as measurement method), and the calculated value is used instead ("Polymer Handbook Fourth Edition", J. Brand, published by Wiley, 1998).

Appropriate conditions for phase separation can be determined based on a three-component phase diagram made from a simple preliminary test to observe the states when changing the ratio of the three components of the polymer A, the polymer B and the organic solvent to dissolve them.

To prepare the phase diagram, the polymers A and B and the solvent are mixed and dissolved at an arbitrary ratio, and left at a stationary condition to determine whether an interface is formed. This test is carried out at least at three or more ratios, preferably at five or more ratios, more preferably at 10 or more ratios. By determining the range where two phase separation takes place and the range where only one phase forms, the conditions for desired phase separation can be found.

At that test, to judge whether a phase-separated state can be formed, after the ratio of the polymers A and B and the solvent is controlled at an appropriate ratio at the temperature and pressure where our processes is to be carried out, the polymers A and B are dissolved completely, after the dissolution, the solution is stirred sufficiently, left at a stationary condition for three days, and observed to determine whether phase separation occurs macroscopically. However, in case where a sufficiently stable emulsion is formed, there is a case where macroscopic phase separation does not occur even after being left at a stationary condition for three days. In such a case, the occurrence of phase separation is determined based on microscopic phase separation observation carried out by using an optical microscope or phase contrast microscope.

FIG. 1 shows an example of a three-component phase diagram at 180° C. where the polymer A is polyamide (supplied by Daicel-Evonik Ltd., "TROGAMID" (registered trademark), CX7323), the polymer B is polyvinyl alcohol (PVA, supplied by Nippon Synthetic Chemical Industry Co., Ltd., "Gohsenol" (registered trademark) GM-14), and the organic solvent is N-methyl-2-pyrrolidone. The black dots indicate points where phase separation does not take place, while the white dots indicate points where phase separation occurs. From these black and white dots, the region where phase separation does not take place and the region where phase separation (phase separation into two phases) occurs can be easily estimated. From this three-component phase diagram, the process is carried out at a component ratio in the region in which two-phase separation occurs.

Concretely, from the three-component phase diagram shown in FIG. 1, the boundary between the region where phase separation does not take place and the region where phase separation occurs is estimated as shown by the solid line, and the process is carried out at the component ratio shown below the boundary.

The phase separation takes place as a result of separation between the polymer A solution phase mainly composed of the polymer A and the polymer B solution phase mainly composed of the polymer B in the organic solvent. Where, the polymer A solution phase is a phase where mainly the polymer A is distributed, and the polymer B solution phase is a phase where mainly the polymer B is distributed. The polymer A solution phase and the polymer B solution phase seem to have a volume ratio that depends on the type and amount of the polymers A and B.

Each concentration of the polymers A and B in the organic solvent is preferably more than 1 mass % and 50 mass % or less relative to the total mass, more preferably more than 1 mass % and 30 mass % or less, and further preferably more than 2 mass % and 20 mass % or less, on the assumption that phase separation can actually take place and that the polymers can actually dissolve in the organic solvent at concentrations in an industrially feasible concentration range.

The interface tension between the two phases of the polymer A solution phase and the polymer B solution phase is small because both phases are formed of an organic solvent, and this feature allows the resulting emulsion to be maintained stably, which seems to be a major factor causing a narrow diameter distribution. In particular, this effect is remarkable when the same organic solvent is used for the polymer A phase and the polymer B phase.

The interface tension between the two phases is too small to measure directly with the commonly-used hanging-drop method in which a solution added to another solution to take measurements. The interface tension, however, can be estimated from the surface tension of each phase exposed to air. Thus, assuming $r_1$ and $r_2$ represent the surface tension of each phase exposed to air, the interface tension $r_{1/2}$ is estimated as an absolute value of $r_{1/2}=r_1-r_2$. Where, the $r_{1/2}$ is preferably in the range of more than 0 mN/m and 10 mN/m or less, more preferably more than 0 mN/m and 5 mN/m or less, further preferably more than 0 mN/m and 3 mN/m or less, and particularly preferably more than 0 mN/m and 2 mN/m or less.

Using the system to be caused with phase separation thus obtained, liquid phases caused with phase separation are mixed to form an emulsion, and thereafter, by bringing a poor solvent into contact therewith, polymer microparticles are produced.

For making microparticles, the steps of forming an emulsion and bringing a poor solvent into contact therewith (hereinafter, also referred to as a step for making microparticles) are carried out in a usual reaction vessel.

We provide a process of making a high thermally resistant polymer into microparticles, and from the viewpoint of easiness of forming an emulsion by an industrial operation, the temperature of forming the emulsion is 100° C. or higher. Although the upper limit is not particularly restricted as long as it is a temperature at which the polymers A and B can dissolve, phase separation is caused and desired microparticles can be obtained, it is usually in the range of 100° C.-300° C., preferably in the range of 100° C.-280° C., more preferably in the range of 120° C.-260° C., further preferably in the range of 120° C.-240° C., particularly preferably in the range of 120° C.-220° C., and most preferably in the range of 120° C.-200° C.

In case where polymer microparticles are used as material, there is a case where microparticles with a narrower particle diameter distribution is required depending upon environment used therewith.

For such a requirement, a temperature control at the step for bringing a poor solvent into contact (step for making microparticles) following the formation of an emulsion is effective, and the temperature is usually in the range of 100° C.-300° C., preferably in the range of 100° C.-280° C., more preferably in the range of 120° C.-260° C., further preferably in the range of 120° C.-240° C., particularly preferably in the range of 120° C.-220° C., and most preferably in the range of 120° C.-200° C. In particular, from the viewpoint of easiness of management of processes for production, the same temperature as that of forming the emulsion is preferred.

For polymer microparticles, there is a case where it is required to design the surface shape of the particles in accordance with the circumstances at which the particles are used, the control of the surface shape is important particularly to improve the flowability of the particles, to improve the sliding ability of the particles, and to improve the touch feeling thereof, and there is a case where microparticles not only having a narrow particle distribution but also having a high sphericity are required.

Toward such a requirement, in the step of making microparticles, to make the shape of the particles in a sphere, it can be made in sphere at a high level by controlling the temperatures at the step of forming an emulsion and at the step of making microparticles as follows.

Namely, by carrying out the steps of forming an emulsion and bringing a poor solvent into contact therewith at a temperature higher than the cooling crystallization temperature that is a thermal property of the polymer A and by making microparticles, the particle diameter distribution can be made narrower, and microparticles made in sphere at a high level can be obtained.

The cooling crystallization temperature means a crystallization temperature determined by a method of differential scanning calorimetry (DSC), and denotes a peak top of an exothermic peak observed when, after the polymer is once heated from 30° C. to a temperature higher than the melting point of the polymer at a temperature elevation speed of 20° C./min., it is kept for one minute, and thereafter, it is cooled down to 0° C. at a temperature lowering speed of 20° C./min.

The suitable pressure from the viewpoint of industrial realization is in the range of from a normal pressure to 100 atm (10.1 MPa), preferably in the range of 1 atm (101.3 kPa) to 50 atm (5.1 MPa), more preferably in the range of 1 atm (101.3 kPa) to 30 atm (3.0 MPa), particularly preferably in the range of 1 atm (101.3 kPa) to 20 atm (2.0 MPa).

The step of making microparticles is carried out in a high temperature range, as the case may be, carried out under a high pressure condition, and it is in a condition where thermal decomposition of the polymer A, the polymer B or the organic solvent is liable to be accelerated and, therefore, it is preferred to carry out it at a condition where the oxygen concentration is as low as possible. The oxygen concentration of the atmosphere in the reaction vessel is preferably 5 vol. % or less, more preferably 1 vol. % or less, further preferably 0.1 vol. % or less, still further preferably 0.01 vol. % or less, and particularly preferably 0.001 vol. % or less.

Because measurement of a very small oxygen concentration is substantially difficult, the oxygen concentration is to be theoretically calculated from the capacity of the reaction vessel, the oxygen volume concentration of an inert gas, the substituted pressure in the vessel and the times thereof.

Further, for the reaction vessel, it is preferred to use an inert gas. Concretely, nitrogen, helium, argon and carbon dioxide can be used, and preferably, it is nitrogen or argon.

Further, from the viewpoint of preventing deterioration due to oxidation of the raw material used in making microparticles, an antioxidant may be used as an additive.

As the antioxidant, because it is added for the purpose of trapping the radical, exemplified are phenolic antioxidant, sulfuric antioxidant, aromatic amine antioxidant, phosphoric antioxidant and the like.

As concrete examples of the antioxidant, exemplified are phenol, hydroquinone, p-methoxy phenol, benzoquinone, 1,2-naphthoquinone, cresol, catechol, benzoic acid, hydroxyl benzoic acid, salicylic acid, hydroxyl benzene sulfonic acid, 2,5-di-t-butyl hydroquinone, 6-t-butyl-m-cresol, 2,6-di-t-butyl-p-cresol, 4-t-butyl catechol, 2,4-dimethyl-6-t-butyl phenol, 2-t-butyl hydroquinone, 2-t-butyl-4-methoxy phenol and the like.

Although the concentration of the antioxidant is not particularly restricted, it is preferably in the range of 0.001-10 mass % relative to the mass of the polymer B, more preferably in the range of 0.01-5 mass %, and most preferably in the range of 0.05-3 mass %.

Emulsion can be formed by mixing respective phases together under such a condition. Namely, an emulsion is produced by adding a shear force to the phase-separation solution obtained as described above.

The microparticles produced by the production process have a very narrow particle diameter distribution. This is because a more uniform emulsion can be obtained by carrying out forming the emulsion at a high temperature as compared to one where the forming is not carried out at a high temperature. This tendency is remarkable in case where a single solvent is used to dissolve both the polymers A and B, and a high thermally resistant polymer, in particular, a crystalline polymer, is used for the polymer A. Therefore, to obtain a sufficient shear force for the formation of an emulsion, stirring due to a generally known method can serve sufficiently, the mixing can be achieved by the known method such as liquid phase stirring using stirring blades, stirring in a continuous twin mixer, mixing in a homogenizer, ultrasonic irradiation or the like.

In particular, in case of stirring using stirring blades, although it is depending upon the shape of the stirring blades, the stirring speed is preferably 50 rpm to 1,200 rpm, more preferably 100 rpm to 1,000 rpm, further preferably 200 rpm to 800 rpm, and particularly preferably 300 to 600 rpm.

As the stirring blades, concretely, exemplified are types of propeller, paddle, flat paddle, turbine, double cone, single cone, single ribbon, double ribbon, screw, and helical ribbon, but, the stirring blades are not particularly limited thereto as long as a shear force can be sufficiently applied to the system. Further, to perform efficient stirring, baffle plates or the like may be provided in the vessel.

Further, to produce an emulsion, in addition to stirrers, widely known devices such as emulsifying machine and dispersion machine may be used. As concrete examples, exemplified are batch-type emulsifying machines such as Homogenizer (supplied by IKA Corporation), Polytron (supplied by Kinematica, Inc.), and T. K. Autohomomixer (supplied by Tokushu Kika Kogyo Co., Ltd.), and others such as Ebara Milder (supplied by Ebara Corporation), T. K. Filmics, T. K. Pipeline Homomixer (supplied by Tokushu Kika Kogyo Co., Ltd.), Colloid Mill (supplied by Shinko-Pantec Co., Ltd.), and Slusher, Trigonal Wet Grinder (supplied by Mitsui Miike Kakoki Co., Ltd.), as well as ultrasonic homogenizers and static mixers.

The emulsion thus obtained is subsequently subjected to a step of precipitating micro particles.

To obtain microparticles of the polymer A, a poor solvent for the polymer A is brought into contact with the emulsion produced by the above-described step to precipitate microparticles having a diameter in correspondence with that of the emulsion.

The contact between the poor solvent and the emulsion may be achieved by either pouring the emulsion in the poor solvent, or pouring the poor solvent in the emulsion, but it is preferable to pour the poor solvent in the emulsion.

The method of pouring the poor solvent is not particularly restricted as long as the polymer microparticles to be produced can be obtained, and any of continuous dropping method, split dropping method and batch addition method may be employed. However, continuous dropping method and split dropping method are preferably employed because they can prevent coagulation, fusion or coalescence of the emulsion from being caused when adding the poor solvent, which may lead to a large particle diameter distribution or bulky grains larger than 1,000 μm, and to industrially perform it efficiently, the most preferable method is continuous dropping method.

Further, the time for adding the poor solvent is within 10 minutes to 50 hours, preferably within 30 minutes to 10 hours, and more preferably within 1 hour to 5 hours.

If it is carried out within a shorter time than these ranges, the emulsion will be likely to undergo coagulation, fusion, or coalescence, which may lead to a large particle diameter distribution or bulky grain. Further, addition for a longer time than the above-described ranges is not practical in consideration of industrial performance.

Implementation within these time ranges serves to suppress coagulation among particles when the emulsion is converted to polymer microparticles, and to produce polymer microparticles with a narrow particle diameter distribution.

Although depending upon the state of the emulsion, the amount of the poor solvent added is preferably from 0.1 to 10 parts by mass, more preferably 0.1 to 5 parts by mass, further preferably 0.2 to 3 parts by mass, particularly preferably 0.2 to 2 parts by mass, and most preferably 0.2 to 1.0 part by mass, relative to the total amount of 1 part by mass of the emulsion.

Although the time of the contact between the poor solvent and the emulsion may be a time sufficient for precipitation of microparticles, to cause sufficient precipitation and obtain an efficient productivity, it is preferably 5 minutes to 50 hours, more preferably 5 minutes to 10 hours, further preferably 10 minutes to 5 hours, particularly preferably 20 minutes to 4 hours, most preferably 30 minutes to 3 hours, following the completion of the addition of the poor solvent.

Powder of the microparticles can be collected by subjecting the dispersion liquid of the polymer microparticles thus obtained to solid-liquid separation with a generally known method such as filtration, reduced pressure filtration, compression filtration, centrifugal separation, centrifugal filtration, spray drying and the like.

For refining, the polymer microparticles obtained from the solid-liquid separation are purified by washing them in a solvent or the like as needed to remove impurities that are carried on the surface or contained.

The process has the advantage that it is possible to recycle the organic solvent and the polymer B separated in the solid-liquid separation step carried out to produce powder of microparticles for again utilizing them.

With respect to recycling, it becomes a factor in continuing a stable production that change of substances of the organic solvent and the polymer B is suppressed in a series of steps for producing microparticles. By applying the process, because change of the polymer B, that has been a problem, can be suppressed, even if the organic solvent and the polymer B are recycled, an advantage can be obtained wherein a stable production becomes possible without quality change in each production batch.

The solvent resulting from the solid-liquid separation is a mixture of the polymer B, the organic solvent and the poor solvent. By removing the poor solvent from this mixture, the remaining liquid can be recycled as the solvent for forming the emulsion. The removal of the poor solvent is carried out with a generally known method, concretely, simple distillation, reduced pressure distillation, precision distillation, thin film distillation, extraction, membrane separation or the like can be exemplified, and preferably, simple distillation, reduced pressure distillation or precision distillation is employed.

When distillation operation such as simple distillation or reduced pressure distillation is performed, because heat is applied to the system, possibly promoting heat decomposition of the polymer B or the organic solvent, it is preferably performed in an oxygen-free state, more preferably in an inert atmosphere. Concretely, it is carried out preferably under a condition of nitrogen, helium, argon, or carbon dioxide. Further, a phenolic compound may be again added as an antioxidant.

For recycling, it is preferred that the poor solvent is removed as much as possible. Concretely, the amount of the remaining poor solvent is 10 mass % or less, preferably 5 mass % or less, more preferably 3 mass % or less, and particularly preferably 1 mass % or less, relatively to the total amount of the organic solvent and the polymer B to be recycled. In the case where the remaining amount is over this range, because the particle diameter distribution of the microparticles becomes broader, or the particles are coagulated, and such a condition is not preferred.

The content of the poor solvent in the solvent mixture used for recycle can be measured by a generally known method such as gas chromatography or the Karl Fischer's method.

In practice, since loss of the organic solvent or the polymer B may take place during the operations for removing the poor solvent, it is preferred to appropriately adjust the composition ratio to the initial ratio.

With respect to the particle diameter of the microparticles thus obtained, it is usually 1,000 μm or less, preferably it can be controlled to be 500 μm or less, more preferably, 300 μm or less, further preferably, 100 μm or less, and particularly preferably, 50 μm or less. As the lower limit, it is usually 50 nm or more, preferably it can be controlled to be 100 nm or more, more preferably, 500 nm or more, further preferably, 1 μm or more, and particularly preferably, 10 μm or more.

Further, the particle diameter distribution of the microparticles obtained becomes a small particle diameter distribution index as compared to a case where the forming of emulsion is carried out at a temperature lower than 100° C. In most cases, the microparticles preferably have a particle diameter distribution index of 3 or less, and it can be 2 or less, 1.5 or less more preferably, 1.2 or less particularly preferably, and most preferably 1.1 or less. Further, a preferred lower limit is 1. The point to be specially mentioned is in that, by performing the emulsion formation at 100° C. or higher, as compared with a case of being performed at a temperature lower than 100° C., microparticles having a smaller particle diameter distribution index can be produced. Such an advantage is particularly remarkable in case where microparticles of a high thermally resistant polymer, in particular, of a crystalline thermoplastic resin, are produced, and by this, for the crystalline thermoplastic resin microparticles, microparticles having a narrow particle diameter distribution can be formed simply.

The average particle diameter of the microparticles can be determined by randomly selecting 100 particles in scanning electron microscope photographs and calculating the arithmetic average of their measured diameters. If there is a particle of a shape that is not a perfect circle but an ellipse or the like, in the photograph, the maximum diameter of the particle is taken as its particle diameter. To determine the particle diameter precisely, it is measured at least at a magnification of 1,000 times or more, preferably 5,000 times or more.

The particle diameter distribution index is calculated from the particle diameter thus determined, based on the following conversion Equation 1:

$$Dn = \sum_{i=1}^{n} Ri/n$$

$$Dv = \sum_{i=1}^{n} Ri^4 / \sum_{i=1}^{n} Ri^3$$

$$PDI = Dv/Dn$$

Ri represents the particle diameter of each particle, n represents the number of measurements (100), Dn represents the number average particle diameter, Dv represents the volume average particle diameter, and PDI represents the particle diameter distribution index.

Since the process is a process of producing microparticles through an emulsion composed of the polymer A solution phase and the polymer B solution phase and it utilizes a polymer solution under a high temperature condition, it is suitable to produce polymer microparticles high in thermal resistance, namely, having a glass transition temperature of a melting point of 100° C. or higher.

However, although the production process produces microparticles of high thermally resistant polymer A, it is not always limited to microparticles of high thermally resistant polymer A. Namely, even for a resin whose solubility in the solvent for the polymer A at a temperature lower than 100° C. is not sufficient even if the glass transition temperature or the melting point, that becomes an index of thermal resistance, is relatively low and which is required to be dissolved under a high temperature condition, the process can be preferably employed. Therefore, among polymers, it can be applied even to one having a glass transition temperature or a melting point of 50° C. or higher, and it is preferable for one of 100° C. or higher, more preferable for one of 150° C. or higher, and as to the upper limit, it is preferable for one of 400° C. or lower from the viewpoint of solubility.

In particular, in recent years, there are many uses for polymer microparticles in which a narrow particle diameter distribution as well as a high thermal resistance for the material are required. Although in vinyl polymers such requirements are satisfied by being generally crosslinked or by using special monomers, our process is preferable because the high thermally resistant polymer can be made into microparticles by utilizing the polymer design as it is, without requiring a special polymer design.

The glass transition temperature referred to here is determined using differential scanning calorimetry (DSC) in a manner that a specimen is heated from 30° C. up to a temperature higher by 30° C. or more than the predicted glass transition temperature at a temperature elevating rate of 20° C./min., held there for 1 minute, then once cooled down to 0° C. at a temperature lowering rate of 20° C./min., held there for 1 minute, and heated again at a temperature elevating rate of 20° C./min. while making measurements to determine the glass transition temperature (Tg). Further, the melting point denotes a temperature of a peak top when a fusion quantity of heat is indicated at the time of the second temperature elevation.

Further, our process is useful to obtain polymer microparticles composed of a thermoplastic resin such as polyethersulfone, polycarbonate, vinyl polymers, polyamide, polyetherimide, polyphenylene ether, polyphenylene sulfide, polyolefin, poly sulfone, polyester, polyether ketone or polyetherether ketone, more preferably polymer microparticles composed of a crystalline thermoplastic resin such as polyamide, polyester or polyphenylene sulfide, and particularly, polymer microparticles having a high thermal resistance.

The microparticles thus produced by the process can be utilized very practically in industrially various uses, since particles having a narrow particle diameter distribution can be obtained and polymer microparticles, in particular, polymer microparticles excellent in thermal resistance, can be produced stably at a good quality.

In particular, because the microparticles have a narrow particle diameter distribution and selection of the material thereof is easy, they are suitable for use in a spacer between a light guide plate and a reflector used in a liquid crystal display and the like. In particular, in use of a reflector used in a side light-system back light using CCFL or LED, in case where a pressing force is applied or a static electricity is generated between a light guide plate and a reflector by the concavo-convex of a body, there is a case where sticking may occur between the light guide plate and the reflector, and as a result, there may occur inconveniences in that the concavo-convex printed on the surface of the light guide plate is chipped and in that a partial white spot may occur on the liquid crystal display at the time of being lit. To prevent such inconveniences from occurring, there is a case where a solution containing particles is coated onto the surface of the reflector and the like to provide concavo-convex thereto, and as the particles therefor, the organic particle (plastic beads) are suitable.

Such organic particle can be produced by the process, and in particular, particles composed of a thermoplastic resin containing an ether bond are very excellent because by containing the ether bond the affinity between the organic particles and a binder resin can be increased and falling thereof can be prevented.

As the thermoplastic resin containing an ether bond, polyether resin, a resin produced by copolymerization of the polyether resin and another resin and the like are exemplified. Concretely, exemplified are polyoxymethylene, formal resin, polyphenylene oxide, polyether ketone, polyetherether ketone, polyetherketone ketone, polyether sulfone, polyphenylene sulfone, polyether imide, polyether ester, polyetherester amide, polyether amide, polyester containing spiroglycol and the like, and from the viewpoint of transparency and reproductivity, polyether ester and polyester containing spiroglycol are preferably used. Particularly preferably, polyether ester, whose elastic modulus can be controlled by the copolymerization ratio, is used. As concrete examples of the polyether ester, various ones are sold from many companies, such as "Hytrel" (registered trademark, supplied by Du Pont Co., Ltd. or Du Pont-Toray Co., Ltd.), "RITEFLEX" (registered trademark, supplied by Ticona Corporation) and "ARNITEL" (registered trademark, supplied by DSM Corporation).

In the thermoplastic resin which is a material of the organic particles, the flexural elastic modulus thereof is preferably more than 500 MPa and 3,000 MPa or less. Although the upper limit of the flexural elastic modulus is 3,000 MPa or less, it is preferably 2,500 MPa or less, and more preferably 2,000 MPa or less. Although the lower limit of the flexural elastic modulus is in the range more than 500 MPa, it is preferably 550 MPa or more, more preferably 600 MPa or more, particularly preferably 800 MPa or more, and extremely preferably 1,000 MPa or more. The flexural elastic modulus means a value measured by ASTM-D790-98. For this measurement, a flexural test piece having a size of 127× 12.7×6.4 mm, which can be obtained by molding pellets of the thermoplastic resin forming the organic particles, dried by hot air at 90° C. for three hours or more, at molding conditions of a cylinder temperature of 240° C. and a mold temperature of 50° C. using an injection molding machine (supplied by Nissei Jushi Kogyo Corporation, NEX-1000), is used as the sample. If the flexural elastic modulus is less than the above-described range, there is a case where white spots may be generated when the particles are coated onto a white film and it is assembled into a liquid crystal display as a reflector. If the flexural elastic modulus is greater than the above-described range, there is a case where scratches may be generated on a light guide plate when the light guide plate and a reflector are rubbed with each other. To control the flexural elastic modulus of the thermoplastic resin within the above-described range, for example, the copolymerization amount of long-chain polyalkylene glycol in the above-described polyether ester resin may be appropriately adjusted. Further, in the series of "Hytrel" supplied by Du Pont Co., Ltd. or Du Pont-Toray Co., Ltd., Hytrel 724 (supplied by Du Pont-Toray Co., Ltd.) and Hytrel 8238 (supplied by Du Pont Co., Ltd.) can achieve the flexural elastic modulus within the above-described range as the thermoplastic resin containing an ether bond.

The number average particle diameter of the organic particles used in the fields such as the above-described reflector and the like is preferably 3 μm or more and 60 μm or less, more preferably 4 μm or more and 20 μm or less, and further preferably 5 μm or more and 15 μm or less. If less than 3 μm, when coated onto a reflector film and incorporated with that reflector film into a liquid crystal display, there is a case where white spots are generated, and if greater than 60 μm, there is a case where the particles fall off from the reflector film. Further, from the viewpoint of providing concavo-convex to the surface of the plate and preventing the sticking at an interlayer with another plate, it is preferably 1 μm or more, and more preferably 2 μm or more. As the upper limit, although it is depending upon the use, for the material used for electronic information equipment, generally it is preferably 100 µm or less.

In the microparticles composed of the thermoplastic resin containing an ether bond, the particle diameter distribution index thereof is preferably in the range of 1-3. It is more preferably in the range of 1-2, and most preferably in the range of 1-1.5. By the condition where the particle diameter distribution index is in the above-described range, under the state where the reflector is pressed onto the light guide plate, it can be prevented that white spots are liable to occur, by close contact of only a part of particles having large particle diameters to the light guide plate and deformation of the particles. Further, in case where the particle diameter distribution index is greater than the above-described range (namely, in case of containing excessively large particles), there is a case where particle clogging occurs in a meyer bar in the coating step and coating line occurs, and such a state is not preferable from the viewpoint of coating appearance. As the method of controlling the particle diameter distribution index in the above-described range, in the process of forming the aforementioned emulsion and obtaining microparticles by adding a poor solvent, a method is preferably employed of controlling the temperature to perform the steps of forming the emulsion and making the microparticles at a temperature of 100° C. or higher.

The laminated film used in the above-described reflector and the like comprises a usual base material film, and a coating layer provided at least on one surface thereof which contains a binder resin and the organic particles.

The organic particles are preferably coated with the binder resin in the coating layer. The organic particles can be hard to be fallen off by being coated with the binder. To coat the organic particles with the binder, it is preferred that the organic particles are composed of a thermoplastic resin containing an ether bond and the binder resin contained in the coating solution is a water-soluble resin. In particular, it is preferred to be a resin containing at least one functional group selected from sulfonic group, carboxylic group, hydroxyl group and salts thereof. More preferably, it is a resin copolymerized with a monomer containing carboxylic group and/or salt of carboxylic group. Further, the coating state can be confirmed by observation of the section of the particle by SEM or TEM. It can be observed more clearly by using ruthenium dyeing and the like.

When the above-described binder resin is water-soluble, it has a good affinity with the base material film described later and the organic particles, the concavo-convex state of the surface and the thickness of the coating can be preferably balanced and a coating layer hardly occurred with falling off of the organic particles can be formed. Further, by the condition where the binder resin is a water-soluble resin, it can be used at a condition of coating solution in which the binder resin and the organic particles are dissolved and dispersed in water. Of course, respective solutions in which the binder resin and the organic particles are dissolved or dispersed in water separately in advance may be appropriately mixed and used. By using a coating solution using water, because coating in an in-line coating process becomes possible, it is preferred from the viewpoint of cost saving. As the process of copolymerizing a monomer containing the above-described functional groups with the binder resin, a known process can be employed. The water-soluble resin is formed preferably from at least one selected from the group consisting of polyester resin, acrylic resin and polyurethane resin, and more preferably formed from polyester resin or acrylic resin. Preferably the binder resin has a good fittability with the base material film and is transparent, and the above-described resins can satisfy these properties. As such water-soluble resins, "Watersol" (registered trademark, supplied by DIC Corporation), "Pesresin" (supplied by Takamatsu Oil & Fat Co., Ltd.) and the like can be obtained on the market.

Further, various additives can be added to the binder resin forming the coating layer as long as the advantages are not damaged. As the additives, for examples, antioxidant, cross-linking agent, fluorescent whitening agent, antistatic agent, coupling agent and the like can be used.

The organic particles can be suitably used as a reflector, and in such an application, the base material film of the reflector is not particularly limited, and it may be either transparent or opaque. As the transparent films, polyester film, polyolefin film, polystyrene film, polyamide film and the like can be exemplified, and the polyester film is preferably used from the viewpoint of easiness of molding. Further, as the opaque films, exemplified are white films disclosed in JP-A-HEI-4-239540, JP-A-2004-330727 and the like, and polyphenylene sulfide films disclosed in JP-A-HEI-6-305019 and the like.

In case where these particles are used for a reflector of a liquid crystal display, a laminated film is preferably used, and the laminated film preferably comprises a base material film, and a coating layer containing the binder resin and the organic particles which is provided on at least one surface of the base material film.

As a process of forming the coating layer, other than a process of coating the coating solution onto the base material film after biaxial stretching (off-line coating process), there is a process of stretching and heat treating a film after being coated with the coating solution (in-line coating process). From the viewpoint of the fittability between the coating layer and the base material film and cost saving, the in-line coating process is preferred. As the in-line coating process, a process of coating the coating solution onto the surface of a non-stretched film and thereafter stretching it biaxially, a process of coating the coating solution onto the surface of a uniaxially stretched film and thereafter further stretching it in a direction across the previous uniaxially stretching direction (for example, in a direction perpendicular to the uniaxially stretching direction) and the like can be exemplified, and the latter process is preferred.

The reflector thus obtained can prevent such inconveniences, as those, in use of a reflector used in a side light-system back light using CCFL or LED, in case where a pressing force is applied or a static electricity is generated between a light guide plate and the reflector by the concavo-convex of a body, in that sticking may occur between the light guide plate and the reflector, and the concavo-convex printed on the surface of the light guide plate may be chipped by the sticking, and in that there may occur a partial white spot on the liquid crystal display at the time of being lit.

EXAMPLES

Hereinafter, our microparticles and processes will be explained in detail based on examples, but this disclosure is not limited to the examples.

(1) Measuring Methods for Average Particle Diameter and Particle Diameter Distribution:

The particle diameter of each microparticle was determined from observations made by scanning electron microscopy (with JSM-6301NF scanning electron microscope, supplied by JEOL Ltd.) at a magnification of 1,000 times. The major axis of the particle was determined as the particle diameter if the shape of the particle was not a perfect circle.

The average particle diameter was determined measuring the diameters of 100 randomly selected particles in scanning electron microscope photographs and calculating their arithmetic average.

The particle diameter distribution index, which represents the particle diameter distribution, was calculated from the diameter of each particle measured above according to the following conversion Equation 2:

$$Dn = \sum_{i=1}^{n} Ri/n$$

$$Dv = \sum_{i=1}^{n} Ri^4 \bigg/ \sum_{i=1}^{n} Ri^3$$

$$PDI = Dv/Dn.$$

In Equation 2, Ri represents diameter of each particle, n represents the number of measurements (100), Dn represents the number average particle diameter, Dv represents the volume average particle diameter, and PDI represents the particle diameter distribution index.

(2) Determination of Interfacial Tension:

A DM-501 automatic contact angle meter, supplied by Kyowa Interface Science Co., Ltd. was used to measure the surface tension of the polymer A solution phase and the polymer B solution phase exposed to air on a hot plate, and the interfacial tension was calculated as the absolute value of the difference ($r_1-r_2$) between their measured surface tensions of the respective phases of $r_1$ and $r_2$.

(3) Determination of Molecular Weight of Polyvinyl Alcohol Group:

With respect to the weight average molecular weight, using gel permeation chromatography, the molecular weight was calculated by comparison with the calibration curve due to polyethylene glycol.

Equipment: LC-10A series, supplied by Shimadzu Corporation
Column: GF-7 MHQ×2, supplied by Showa Denko K.K.
Mobile phase: 10 mmol/L, lithium bromide aqueous solution
Flow rate: 1.0 ml/min.
Detector: differential refractometer
Column temperature: 40° C.

(4) Determination Due to Differential Scanning Calorimetry:

It was determined under nitrogen atmosphere by the aforementioned method, using a differential scanning calorimeter (supplied by Seiko Instruments Inc., Robot DSC, RD-C220).

(5) Water Content in a Recycled Solvent:

The water content in solvent was determined using Karl Fischer's method (equipment name: a moisture meter, CA-06, supplied by Mitsubishi Chemical Corporation).

(6) Quantitative Analysis of Sodium Acetate Contained in Polyvinyl Alcohol Group:

It was determined by sodium acetate dissolution and titration method described in JIS "method for testing polyvinyl alcohol" (K6726 (1994)).

Reference Example 1

Washing 1 of Sodium Acetate in Polyvinyl Alcohol Group 12 g of polyvinyl alcohol (supplied by Nippon Synthetic Chemical Industry Co., Ltd., G-type "Gohsenol" (registered trademark) GM-14, weight average molecular weight: 29,000, SP value: 32.8 $(J/cm^3)^{1/2}$, content of sodium acetate: 0.23 mass %) was added to extraction thimbles (diameter: 26 cm, height: 13 cm) in a Soxhlet extractor, and reflux by heating was carried out for 8 hours using 150 g of methanol. By drying the obtained polyvinyl alcohol at 80° C. for 10 hours using a heating vacuum dryer, polyvinyl alcohol little with content of sodium acetate was obtained. The quantified sodium acetate in the obtained polyvinyl alcohol was 0.01 mass %.

Reference Example 2

Washing 2 of Sodium Acetate in Polyvinyl Alcohol Group 50 g of polyvinyl alcohol (supplied by Nippon Synthetic Chemical Industry Co., Ltd., G-type "Gohsenol" (registered trademark) GM-14, weight average molecular weight: 29,000, SP value: 32.8 $(J/cm^3)^{1/2}$, content of sodium acetate: 0.23 mass %) and 500 ml of methanol were added in a 1 L round bottom flask, and stirred under a room temperature condition for one hour. Thereafter, the solution was filtrated by suction filtration (filter paper 5A, 90 mmϕ). Following thereto, the same operation was repeated two times, totally three times, and then, by drying it at 80° C. for 10 hours, polyvinyl alcohol little with content of sodium acetate was obtained. The quantified sodium acetate in the obtained polyvinyl alcohol was 0.05 mass %.

Reference Example 3

Washing 3 of Sodium Acetate in Polyvinyl Alcohol Group 50 g of polyvinyl alcohol (supplied by Nippon Synthetic Chemical Industry Co., Ltd., A-type "Gohsenol" (registered trademark) AL-06, weight average molecular weight: 11,000, SP value: 32.8 $(J/cm^3)^{1/2}$, content of sodium acetate: 0.23 mass %) and 500 ml of methanol were added in a 1 L round bottom flask, and stirred under a room temperature condition for one hour. Thereafter, the solution was filtrated by suction filtration (filter paper 5A, 90 mmϕ). Following thereto, the same operation was repeated two times, totally three times, and then, by drying it at 80° C. for 10 hours, polyvinyl alcohol little with content of sodium acetate was obtained. The quantified sodium acetate in the obtained polyvinyl alcohol was 0.04 mass %.

Reference Example 4

Washing 4 of Sodium Acetate in Polyvinyl Alcohol Group 50 g of polyvinyl alcohol (supplied by Nippon Synthetic Chemical Industry Co., Ltd., G-type "Gohsenol" (registered trademark) GL-05, weight average molecular weight: 11,000, SP value: 32.8 $(J/cm^3)^{1/2}$, content of sodium acetate: 0.23 mass %) and 500 ml of methanol were added in a 1 L round bottom flask, and stirred under a room temperature condition for one hour. Thereafter, the solution was filtrated by suction filtration (filter paper 5A, 90 mmϕ). Following thereto, the same operation was repeated two times, totally three times, and then, by drying it at 80° C. for 10 hours, polyvinyl alcohol little with content of sodium acetate was obtained. The quantified sodium acetate in the obtained polyvinyl alcohol was 0.05 mass %.

29

Reference Example 5

Washing 5 of Sodium Acetate in Polyvinyl Alcohol Group 50 g of polyvinyl alcohol (supplied by Wako Pure Chemical Industries, Ltd., PVA-1500, weight average molecular weight: 29,000, SP value: 32.8 $(J/cm^3)^{1/2}$, content of sodium acetate: 0.20 mass %) and 500 ml of methanol were added in a 1 L round bottom flask, and stirred under a room temperature condition for one hour. Thereafter, the solution was filtrated by suction filtration (filter paper 5A, 90 mmϕ). Following thereto, the same operation was repeated two times, totally three times, and then, by drying it at 80° C. for 10 hours, polyvinyl alcohol little with content of sodium acetate was obtained. The quantified sodium acetate in the obtained polyvinyl alcohol was 0.05 mass %.

Example 1

Process of Producing Polyamide Microparticles Using Polyvinyl Alcohol Little with Content of Sodium Acetate 35 g of polyamide (weight average molecular weight: 17,000, "TROGAMID" (registered trademark), CX7323, supplied by Daicel-Evonik Ltd.) as the polymer A, 287 g of N-methyl-2-pyrrolidone (SP value: 23.1 $(J/cm^3)^{1/2}$) as the organic solvent and 28 g of polyvinyl alcohol little with content of sodium acetate prepared in Reference Example 1 as the polymer B were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 2 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time added with the ion exchange water of about 200 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 34.0 g of white solid material. When the obtained powder were observed by a scanning electron microscope, they were polyamide microparticles having a true sphere-like particle shape, an average particle diameter of 24.0 µm, and a particle diameter distribution index of 1.11. The melting point of the polyamide used in this Example was 250° C., the heat of fusion was 23.7 J/g, and the cooling crystallization temperature was not detected. The SP value determined by the calculation method was 23.3 $(J/cm^3)^{1/2}$. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,800, and it almost did not change from the value before being used.

Example 2

Process 2 of Producing Polyamide Microparticles Using Polyvinyl Alcohol Little with Content of Sodium Acetate 35 g of polyamide (weight average molecular weight: 17,000, "TROGAMID" (registered trademark), CX7323,

30 supplied by Daicel-Evonik Ltd.) as the polymer A, 287 g of N-methyl-2-pyrrolidone as the organic solvent and 28 g of polyvinyl alcohol little with content of sodium acetate prepared in Reference Example 2 as the polymer B were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 2 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time added with the ion exchange water of about 200 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 34.0 g of white solid material. When the obtained powder were observed by a scanning electron microscope, they were polyamide microparticles having a true sphere-like particle shape, an average particle diameter of 24.8 µm, and a particle diameter distribution index of 1.23. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 29,100, and it almost did not change from the value before being used.

Example 3

Process of Producing Polyamide Microparticles by Adding an Acid 28 g of polyamide (weight average molecular weight: 17,000, "TROGAMID" (registered trademark), CX7323, supplied by Daicel-Evonik Ltd.) as the polymer A, 301 g of N-methyl-2-pyrrolidone as the organic solvent and 21 g of polyvinyl alcohol (supplied by Nippon Synthetic Chemical Industry Co., Ltd., "Gohsenol" (registered trademark) GM-14, weight average molecular weight: 29,000, SP value: 32.8 $(J/cm^3)^{1/2}$, content of sodium acetate: 0.23 mass %) as the polymer B were added into a 1,000 ml pressure resistant glass autoclave (supplied by Taiatsu Techno Corporation, Hyper Glaster, TEM-V1000N), 0.21 g of tartaric acid (pKa1=2.82, thermal decomposition temperature; 275° C.) was added (the amount of the acid functional group was 4.74 times mol relatively to sodium acetate), after being replaced with nitrogen of 99 volume % or more, heated to 180° C., and stirred for 2 hours until the polymers were dissolved. At that time, the concentration of oxygen is 1% or less theoretically. Thereafter, 350 g of water was dropped as the poor solvent at a speed of 2.92 g/min. through a feeding pump. At the time added with the ion exchange water of about 200 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 27.0 g of white solid material. When the obtained powder were observed by a scanning electron microscope, they were polyamide microparticles having a true sphere-like particle shape, an average particle diameter of 77.5 µm, and a particle diameter distribution index of 2.00.

Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,200, and it almost did not change from the value before being used.

Example 4

Process of Producing Amorphous Polyamide Microparticles 35 g of polyamide (weight average molecular weight: 12,300, "Grilamide" (registered trademark) TR55, supplied by EMS Werke, Inc.) as the polymer A, 287 g of N-methyl-2-pyrrolidone as the organic solvent and 28 g of polyvinyl alcohol little with content of sodium acetate prepared in Reference Example 2 (weight average molecular weight: 29,000, SP value: 32.8 $(J/cm^3)^{1/2}$) as the polymer B were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 2 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time added with the ion exchange water of about 200 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 33.8 g of white solid material. When the obtained powder were observed by a scanning electron microscope, they were polyamide microparticles having a true sphere-like particle shape, an average particle diameter of 20.6 μm, and a particle diameter distribution index of 1.19. Further, the estimated value of the interfacial tension of this system was 2 mN/m or less. Where, the polyamide used in this Example did not have a melting point, and the heat of fusion was not detected. The SP value was determined by the calculation method, and it was 23.3 $(J/cm^3)^{1/2}$. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,500, and it almost did not change from the value before being used.

Example 5

Process of Producing Nylon 1010 Microparticles 35 g of polyamide 1010 (weight average molecular weight: 38,000, "Rilsan" (registered trademark) AESNOTL-44, supplied by Arkema K.K.) as the polymer A, 273 g of N-methyl-2-pyrrolidone as the organic solvent and 42 g of polyvinyl alcohol little with content of sodium acetate prepared in Reference Example 2 (weight average molecular weight: 29,000, SP value: 32.8 $(J/cm^3)^{1/2}$) as the polymer B were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 2 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 110 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 34.0 g of white solid material. When the obtained powder were observed by a scanning electron microscope, they were polyamide microparticles having a true sphere-like particle shape, an average particle diameter of 11.8 μm, and a particle diameter distribution index of 1.21. The melting point of the polyamide used in this Example was 207° C., the heat of fusion was 29.0 J/g, and the cooling crystallization temperature was 144° C. The SP value was determined by the calculation method, and it was 22.47 $(J/cm^3)^{1/2}$. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,500, and it almost did not change from the value before being used.

Example 6

Process of Producing Nylon 610 Microparticles 42 g of polyamide 610 (weight average molecular weight: 37,000, "AMILAN" (registered trademark) CM2001, supplied by Toray Industries, Inc.) as the polymer A, 266 g of N-methyl-2-pyrrolidone as the organic solvent and 32.8 g of polyvinyl alcohol little with content of sodium acetate prepared in Reference Example 3 (weight average molecular weight: 11,000, SP value: 32.8 $(J/cm^3)^{1/2}$) as the polymer B were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 2 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 50 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 41.0 g of white solid material. When the obtained powder were observed by a scanning electron microscope, they were polyamide microparticles having a true sphere-like particle shape, an average particle diameter of 5.4 μm, and a particle diameter distribution index of 5.25. The melting point of the polyamide used in this Example was 225° C., the heat of fusion was 53.2 J/g, and the cooling crystallization temperature was 167° C. The SP value was determined by the calculation method, and it was 23.60 $(J/cm^3)^{1/2}$. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,500, and it almost did not change from the value before being used.

Example 7

Process of Producing Nylon 11 Microparticles 24.5 g of polyamide 11 (weight average molecular weight: 38,000, "Rilsan" (registered trademark) BMNO, supplied by Arkema K.K.) as the polymer A, 301 g of N-methyl-2-pyrrolidone as the organic solvent and 24.5 g of polyvinyl alcohol little with content of sodium acetate prepared in Reference Example 2 (weight average molecular weight: 11,000, SP value: 32.8 $(J/cm^3)^{1/2}$) as the polymer B were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 2 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 50 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 24.1 g of white solid material. When the obtained powder were observed by a scanning electron microscope, they were polyamide microparticles having a true sphere-like particle shape, an average particle diameter of 10.5 µm, and a particle diameter distribution index of 1.40. The melting point of the polyamide used in this Example was 196° C., the heat of fusion was 25.8 J/g, and the cooling crystallization temperature was 144° C. The SP value was determined by the calculation method, and it was 22.04 $(J/cm^3)^{1/2}$. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,500, and it almost did not change from the value before being used.

Example 8

Process of Producing Nylon 12 Microparticles 17.5 g of polyamide 12 (weight average molecular weight: 38,000, "Rilsan" (registered trademark) AESNOTL-44, supplied by Arkema K.K.) as the polymer A, 315 g of N-methyl-2-pyrrolidone as the organic solvent and 17.5 g of polyvinyl alcohol little with content of sodium acetate prepared in Reference Example 4 (weight average molecular weight: 11,000, SP value: 32.8 $(J/cm^3)^{1/2}$) as the polymer B were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 2 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 50 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 17.0 g of white solid material. When the obtained powder were observed by a scanning electron microscope, they were polyamide microparticles having a true sphere-like particle shape, an average particle diameter of 3.8 µm, and a particle diameter distribution index of 2.98. The melting point of the polyamide used in this Example was 183° C., the heat of fusion was 27.3 J/g, and the cooling crystallization temperature was 138° C. The SP value was determined by the calculation method, and it was 21.70 $(J/cm^3)^{1/2}$. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,500, and it almost did not change from the value before being used.

Example 9

Process of Producing Polyamide Microparticles by Adding an Acid 21 g of polyamide CX7323 (weight average molecular weight: 17,000, supplied by Daicel-Evonik Ltd.) as the polymer A, 287 g of N-methyl-2-pyrrolidone as the organic solvent, 42 g of polyvinyl alcohol (supplied by Nippon Synthetic Chemical Industry Co., Ltd., G-type "Gohsenol" (registered trademark) GM-14, weight average molecular weight: 29,000, SP value: 32.8 $(J/cm^3)^{1/2}$) as the polymer B and 0.21 g of tartaric acid were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 4 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 30 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 20.0 g of white solid material. When the obtained powder were observed by a scanning electron microscope, they were polyamide microparticles having a true sphere-like particle shape, an average particle diameter of 22.4 µm, and a particle diameter distribution index of 1.15. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,500, and it almost did not change from the value before being used.

Example 10

Process of Producing Polyamide Microparticles by Adding an Acid 28 g of polyamide CX7323 (weight average molecular weight: 17,000, supplied by Daicel-Evonik Ltd.) as the polymer A, 290.5 g of N-methyl-2-pyrrolidone as the organic solvent, 31.5 g of polyvinyl alcohol (supplied by Nippon Synthetic Chemical Industry Co., Ltd., G-type "Gohsenol" (registered trademark) GM-14, weight average molecular weight: 29,000, SP value: 32.8 $(J/cm^3)^{1/2}$) as the polymer B and 0.16 g of L-tartaric acid were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 4 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 30 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 27.5 g of white solid material. When the obtained powder were observed by a scanning electron microscope, they were polyamide microparticles having a true sphere-like particle shape, an average particle diameter of 32.6 μm, and a particle diameter distribution index of 1.18. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 29,500, and it almost did not change from the value before being used.

Example 11

Process of Producing Polyamide Microparticles by Adding an Acid 10.5 g of polyamide CX7323 (weight average molecular weight: 17,000, supplied by Daicel-Evonik Ltd.) as the polymer A, 297.5 g of N-methyl-2-pyrrolidone as the organic solvent, 42.0 g of polyvinyl alcohol (supplied by Nippon Synthetic Chemical Industry Co., Ltd., G-type "Gohsenol" (registered trademark) GM-14, weight average molecular weight: 29,000, SP value: 32.8 $(J/cm^3)^{1/2}$) as the polymer B and 0.21 g of L-tartaric acid were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 4 hours until the polymers were dissolved. At that time, the concentration of oxygen is 1% or less theoretically. Thereafter, 350 g of ion exchange water was dropped as the poor solvent at a speed of 2.91 g/min. through a feeding pump. At the time added with the ion exchange water of about 30 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 9.8 g of white solid material. When the obtained powder were observed by a scanning electron microscope, they were polyamide microparticles having a true sphere-like particle shape, an average particle diameter of 14.6 μm, and a particle diameter distribution index of 1.11. Further, the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 28,500, and it almost did not change from the value before being used.

Example 12

Process of Producing Polyester Elastomer Microparticles 28 g of polyester elastomer "Hytrel" (registered trademark) 7247 (supplied by Du Pont-Toray Co., Ltd., weight average molecular weight: 29,000, flexural elastic modulus: 600 MPa), 304.5 g of N-methyl-2-pyrrolidone (supplied by Kanto Chemical Co., Inc.) and 17.5 g of polyvinyl alcohol (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 26.5 g of white solid materials. When the solid materials were observed by a scanning electron microscope, they were microparticles having a true sphere-like particle shape, an average particle diameter of 5.5 μm, and a particle diameter distribution index of 1.12. Further, as the result of analyzing the white solid materials by a laser particle diameter distribution meter (SALD-2100, supplied by Shimadzu Corporation), the volume average particle diameter was 5.5 μm, and the particle diameter distribution index was 1.12. The melting point of this polyester elastomer was 218° C., the heat of fusion was 24.3 J/g, and the cooling crystallization temperature was 157° C. The SP value was determined by the calculation method, and it was 19.5 $(J/cm^3)^{1/2}$. Further, the estimated value of the interfacial tension of this system was 2 mN/m or less. The solubility (room temperature) of this polyester elastomer relative to water, which was the poor solvent, was 0.1 mass % or less.

When the molecular weight of polyvinyl alcohol in the filtrated solution after finishing to make particles was determined, the weight average molecular weight was 29,500, and it almost did not change from the value before being used.

As a result of analyzing the particles obtained in this Example (white solid materials) by a laser particle diameter distribution meter (SALD-2100, supplied by Shimadzu Corporation), the volume average particle diameter was 5.5 μm, and the particle diameter distribution index was 1.22.

Example 13

Process of Producing Polyester Elastomer Microparticles 28 g of polyester elastomer "Hytrel" (registered trademark) 7247 (supplied by Du Pont-Toray Co., Ltd., weight average molecular weight: 29,000), 308 g of N-methyl-2- pyrrolidone (supplied by Kanto Chemical Co., Inc.) and 14 g of polyvinyl alcohol (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 25.5 g of white solid materials. When the solid materials were observed by a scanning electron microscope, they were microparticles having a true sphere-like particle shape, an average particle diameter of 8.6 µm, and a particle diameter distribution index of 1.22. Further, the estimated value of the interfacial tension of this system was 2 mN/m or less. The solubility (room temperature) of this polyester elastomer relative to water, which was the poor solvent, was 0.1 mass % or less.

When the molecular weight of polyvinyl alcohol in the filtrated solution after finishing to make particles was determined, the weight average molecular weight was 29,800, and it almost did not change from the value before being used.

As a result of analyzing the particles obtained in this Example (white solid materials) by a laser particle diameter distribution meter (SALD-2100, supplied by Shimadzu Corporation), the volume average particle diameter was 8.6 µm, and the particle diameter distribution index was 1.22.

Example 14

Process of Producing Polyester Elastomer Microparticles 28 g of polyester elastomer "Hytrel" (registered trademark) 7247 (supplied by Du Pont-Toray Co., Ltd., weight average molecular weight: 29,000), 301 g of N-methyl-2-pyrrolidone (supplied by Kanto Chemical Co., Inc.) and 10.5 g of polyvinyl alcohol (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 26.0 g of white solid materials. When the solid materials were observed by a scanning electron microscope, they were microparticles having a true sphere-like particle shape, an average particle diameter of 12.6 µm, and a particle diameter distribution index of 1.22. Further, the estimated value of the interfacial tension of this system was 2 mN/m or less. The solubility (room temperature) of this polyester elastomer relative to water, which was the poor solvent, was 0.1 mass % or less.

When the molecular weight of polyvinyl alcohol in the filtrated solution after finishing to make particles was determined, the weight average molecular weight was 27,500, and it almost did not change from the value before being used.

As a result of analyzing the particles obtained in this Example (white solid materials) by a laser particle diameter distribution meter (SALD-2100, supplied by Shimadzu Corporation), the volume average particle diameter was 12.5 µm, and the particle diameter distribution index was 1.28.

Example 15

Process of Producing Polyester Elastomer Microparticles 17.5 g of polyester elastomer "Hytrel" (registered trademark) 8238 (supplied by Du Pont Co., Ltd., weight average molecular weight: 27,000, flexural elastic modulus: 1,100 MPa), 315 g of N-methyl-2-pyrrolidone and 17.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 14.9 g of white solid materials. When the obtained powder were observed by a scanning electron microscope, they were polyester elastomer microparticles having a true sphere-like particle shape, an average particle diameter of 4.3 µm, a volume average particle diameter of 5.4 µm, and a particle diameter distribution index of 1.25.

When observed by a scanning electron microscope, they were true sphere-like microparticles. The melting point of this polyester elastomer was 224° C., the heat of fusion was 25.8 J/g, and the cooling crystallization temperature of the polyester elastomer was 161° C. The SP value determined by the calculation method was 19.8 $(J/cm^3)^{1/2}$.

The solubility (room temperature) of this polyester elastomer relative to water, which was the poor solvent, was 0.1 mass % or less. The estimated value of the interfacial tension of this system was 2 mN/m or less. When the molecular weight of polyvinyl alcohol in the filtrated solution after finishing to make particles was determined, the weight average molecular weight was 28,500, and it almost did not change from the value before being used.

Example 16

Process of Producing Polyester Elastomer Microparticles 33.25 g of polyester elastomer "Hytrel" (registered trademark) 8238 (supplied by Du Pont Co., Ltd., weight average molecular weight: 27,000), 299.25 g of N-methyl-2-pyrrolidone and 17.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 28.3 g of white solid materials. When the obtained powder were observed by a scanning electron microscope, they were polyester elastomer microparticles having a true sphere-like particle shape, an average particle diameter of 12.0 µm, a volume average particle diameter of 14.7 µm, and a particle diameter distribution index of 1.23. When observed by a scanning electron microscope, they were true sphere-like microparticles. The estimated value of the interfacial tension of this system was 2 mN/m or less.

When the molecular weight of polyvinyl alcohol in the filtrated solution after finishing to make particles was determined, the weight average molecular weight was 29,500, and it almost did not change from the value before being used.

Example 17

Process of producing polyester elastomer microparticles

Terephthalic acid of 48.0 parts, 1,4-butane diol of 42.0 parts and polytetramethylene glycol having a weight average molecular weight of about 3,000 of 10.0 parts were charged into a reaction vessel having a helical ribbon type stirring blade together with titanium tetrabutoxide of 0.01 part and mono-n-butyl-monohydroxy tin oxide of 0.005 part, and they were served to esterification by heating them at 190 to 225° C. for 3 hours while distilling reaction water outside the system. Tetra-n-butyl titanate of 0.06 part was additionally added to the reaction mixture, after "IRGANOX" 1098 (hindered phenol-based antioxidant, supplied by Ciba Japan K.K.) of 0.02 part was added, the temperature of the system was elevated up to 245° C., then the pressure in the system was reduced by 30 Pa for 50 minutes, and under that condition, polymerization was taken place for 2 hours and 50 minutes to obtain aliphatic polyether ester copolymer (D1). The melting point was 226° C., the weight average molecular weight was 28,000, and the flexural elastic modulus was 1,800 MPa.

33.25 g of polyether ester copolymer (D1), 299.25 g of N-methyl-2-pyrrolidone and 17.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass %) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 28.3 g of white solid materials. When the obtained powder were observed by a scanning electron microscope, they were polyester elastomer microparticles composed of polyether ester copolymer having a true sphere-like particle shape, an average particle diameter of 12.0 µm, a volume average particle diameter of 14.7 µm, and a particle diameter distribution index of 1.23. When observed by a scanning electron microscope, they were true sphere-like microparticles. The estimated value of the interfacial tension of this system was 2 mN/m or less.

When the molecular weight of polyvinyl alcohol in the filtrated solution after finishing to make particles was determined, the weight average molecular weight was 29,500, and it almost did not change from the value before being used.

Example 18

Process of Producing Polyester Elastomer Microparticles

Terephthalic acid of 26.7 parts, 1,4-butane diol of 23.3 parts and polytetramethylene glycol having a weight average molecular weight of about 3,000 of 50.0 parts were charged into a reaction vessel having a helical ribbon type stirring blade together with titanium tetrabutoxide of 0.01 part and mono-n-butyl-monohydroxy tin oxide of 0.005 part, and they were served to esterification by heating them at 190 to 225° C. for 3 hours while distilling reaction water outside the system. Tetra-n-butyl titanate of 0.06 part was additionally added to the reaction mixture, after "IRGANOX" 1098 (hindered phenol-based antioxidant, supplied by Ciba Japan K.K.) of 0.02 part was added, the temperature of the system was elevated up to 245° C., then the pressure in the system was reduced by 30 Pa for 50 minutes, and under that condition, polymerization was taken place for 2 hours and 50 minutes to obtain aliphatic polyether ester copolymer (D2). The melting point was 210° C., the weight average molecular weight was 28,000, and the flexural elastic modulus was 450 MPa.

Then, 33.25 g of polyether ester copolymer (D2), 299.25 g of N-methyl-2-pyrrolidone and 17.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 28.3 g of white solid materials. When the obtained powder were observed by a scanning electron microscope, they were polyester elastomer microparticles composed of polyether ester copolymer having a true sphere-like particle shape, an average particle diameter of 12.0 µm, and a particle diameter distribution index of 1.23. When observed by a scanning electron microscope, they were true sphere-like microparticles. The estimated value of the interfacial tension of this system was 2 mN/m or less.

When the molecular weight of polyvinyl alcohol in the filtrated solution after finishing to make particles was determined, the weight average molecular weight was 29,500, and it almost did not change from the value before being used.

Example 19

Process of Producing Polyester Elastomer Microparticles 14.6 g of polyester elastomer ("Hytrel" (registered trademark) 8238, (supplied by Du Pont Co., Ltd., weight average molecular weight: 27,000, flexural elastic modulus: 1,100 MPa), 300 g of N-methyl-2-pyrrolidone and 17.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 12.4 g of white solid materials. When the obtained powder were observed by a scanning electron microscope, they were polyester elastomer microparticles having a true sphere-like particle shape, an average particle diameter of 1.5 μm, and a particle diameter distribution index of 1.21. The estimated value of the interfacial tension of this system was 2 mN/m or less.

When the molecular weight of polyvinyl alcohol in the filtrated solution after finishing to make particles was determined, the weight average molecular weight was 27,500, and it almost did not change from the value before being used.

Example 20

Process of Producing Polyester Elastomer Microparticles 15.2 g of polyester elastomer ("Hytrel" (registered trademark) 8238, supplied by Du Pont Co., Ltd., weight average molecular weight: 27,000, flexural elastic modulus: 1,100 MPa), 300 g of N-methyl-2-pyrrolidone and 17.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 12.9 g of white solid materials. When the obtained powder were observed by a scanning electron microscope, they were polyester elastomer microparticles having a true sphere-like particle shape, an average particle diameter of 2.2 μm, and a particle diameter distribution index of 1.22. The estimated value of the interfacial tension of this system was 2 mN/m or less.

When the molecular weight of polyvinyl alcohol in the filtrated solution after finishing to make particles was determined, the weight average molecular weight was 26,500, and it almost did not change from the value before being used.

Example 21

Process of Producing Polyester Elastomer Microparticles by Adding an Acid 24.5 g of polyester elastomer "Hytrel" (registered trademark) 8238, (supplied by Du Pont Co., Ltd., weight average molecular weight: 27,000), 308 g of N-methyl-2-pyrrolidone and 17.5 g of polyvinyl alcohol (supplied by Nippon Synthetic Chemical Industry Co., Ltd., "Gohsenol" (registered trademark) GM-14, weight average molecular weight: 29,000, SP value: 32.8 $(J/cm^3)^{1/2}$, content of sodium acetate: 0.23 mass %) as the polymer B were added into a 1,000 ml pressure resistant glass autoclave (supplied by Taiatsu Techno Corporation, Hyper Glaster, TEM-V1000N), 0.21 g of tartaric acid (pKa1=2.82, thermal decomposition temperature; 275° C.) was added (the amount of the acid functional group was 4.74 times mol relatively to sodium acetate), after being replaced with nitrogen, heated to 180° C., and stirred for 2 hours until the polymers were dissolved. Thereafter, 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 23.9 g of white solid materials. When the obtained powder were observed by a scanning electron microscope, they were polyester elastomer microparticles having a true sphere-like particle shape, an average particle diameter of 23.4 μm, and a particle diameter distribution index of 1.25.

When observed by a scanning electron microscope, they were true sphere-like microparticles.

The solubility (room temperature) of this polyester elastomer relative to water, which was the poor solvent, was 0.1 mass % or less. The estimated value of the interfacial tension of this system was 2 mN/m or less.

When the molecular weight of polyvinyl alcohol in the filtrated solution after finishing to make particles was determined, the weight average molecular weight was 28,500, and it almost did not change from the value before being used.

Example 22

Process of Producing Polyester Elastomer Microparticles at a Temperature of a Cooling Crystallization Temperature or Lower 17.5 g of polyester elastomer "Hytrel" (registered trademark) 7247 (supplied by Du Pont-Toray Co., Ltd., weight average molecular weight: 29,000), 315.0 g of N-methyl-2-pyrrolidone and 17.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, the temperature was lowered down to 140° C., and 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 17.0 g of white solid materials. When the obtained powder were observed by a scanning electron microscope, they were porous microparticles, and polyester elastomer microparticles having an average particle diameter of 9.3 μm, a volume average particle diameter of 11.8 μm, and a particle diameter distribution index of 1.27.

When observed by a scanning electron microscope, they were porous microparticles. The melting point of this polyester elastomer was 224° C., and the cooling crystallization temperature of this polyester elastomer was 161° C. The estimated value of the interfacial tension of this system was 2 mN/m or less. When the molecular weight of polyvinyl alcohol in the filtrated solution after finishing to make particles was determined, the weight average molecular weight was 29,800, and it almost did not change from the value before being used.

Example 23

Process of Producing Polyester Elastomer Microparticles at a Temperature of a Cooling Crystallization Temperature or Lower 17.5 g of polyester elastomer "Hytrel" (registered trademark) 8238 (supplied by Du Pont Co., Ltd., weight average molecular weight: 27,000), 315.0 g of N-methyl-2-pyrrolidone and 17.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, the temperature was lowered down to 140° C., and 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 17.2 g of white solid materials. When the obtained powder were observed by a scanning electron microscope, they were porous microparticles, and polyester elastomer microparticles having an average particle diameter of 16.4 μm, a volume average particle diameter of 19.3 μm, and a particle diameter distribution index of 1.28. When observed by a scanning electron microscope, they were porous microparticles. The melting point of this polyester elastomer was 224° C., and the cooling crystallization temperature of this polyester elastomer was 161° C. The estimated value of the interfacial tension of this system was 2 mN/m or less.

When the molecular weight of polyvinyl alcohol in the filtrated solution after finishing to make particles was determined, the weight average molecular weight was 28,800, and it almost did not change from the value before being used.

Example 24

Process of Producing Polyamide Microparticles Using Recycled Solvent

The filtrated solution obtained in Example 1 was distilled in water under a nitrogen atmosphere at a temperature of 80° C. and at a pressure-reduced condition of 50 kPa, and it was carried out until the water content determined by a moisture meter (supplied by Mitsubishi Chemical Corporation, a moisture meter CA-06) became 1 mass % or less. The water content at that time was 0.45 mass %, and when the polyvinyl alcohol, which was the polymer B in the residual solution, was quantified by gel permeation chromatography, the concentration of the polyvinyl alcohol was 8.2 mass %. 305 g of the residual solution (containing 280 g of N-methyl-2-pyrrolidone and 25 g of polyvinyl alcohol), 35.0 g of polyamide (weight average molecular weight: 17,000, "TROGAMID" (registered trademark), CX7323, supplied by Daicel-Evonik Ltd.) as the polymer A and 3.0 g of polyvinyl alcohol (supplied by Wako Pure Chemical Industries, Ltd., PVA-1500, weight average molecular weight: 29,000, SP value: 32.8 $(J/cm^3)^{1/2}$, content of sodium acetate: 0.2%) (if it is supposed that the sodium acetate in the recycled polyvinyl alcohol is same as that before being added, the content of sodium acetate contained in polyvinyl alcohol totaled with the amount recycled and the amount newly added is calculated as about 0.03%) as the polymer B were added into a 1,000 ml pressure resistant glass autoclave (supplied by Taiatsu Techno Corporation, Hyper Glaster, TEM-V1000N), 7.0 g of N-methyl-2-pyrrolidone was added as the organic solvent, after being replaced with nitrogen of 99 volume % or more, heated to 180° C., and stirred for 2 hours until the polymers were dissolved. At that time, the concentration of oxygen is 1% or less theoretically. Thereafter, 350 g of ion exchange water was dropped as the poor solvent at a speed of 2.92 g/min. through a feeding pump. At the time added with the ion exchange water of about 200 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 33.6 g of white solid material. When the obtained powder were observed by a scanning electron microscope, they were polyamide microparticles having a true sphere-like particle shape, an average particle diameter of 23.8 μm, and a particle diameter distribution index of 1.14, and they had an average particle diameter, a particle diameter distribution index and a yield almost equal to those in Example 1.

When the molecular weight of polyvinyl alcohol in the filtrated solution after finishing to make particles was determined, the weight average molecular weight was 29,400, and it was understood to be able to employ recycling. Namely, the microparticles can be stably produced even if recycling is employed.

Example 25

Process of Producing Polyamide Microparticles Using Usual PVA 35 g of polyamide (weight average molecular weight: 17,000, "TROGAMID" (registered trademark), CX7323, supplied by Daicel-Evonik Ltd.) as the polymer A, 287 g of N-methyl-2-pyrrolidone as the organic solvent and 28 g of polyvinyl alcohol (supplied by Nippon Synthetic Chemical Industry Co., Ltd., "Gohsenol" (registered trademark) GM-14, weight average molecular weight: 29,000, content of sodium acetate: 0.23 mass %, SP value: 32.8 $(J/cm^3)^{1/2}$) as the polymer B were added into a 1,000 ml pressure resistant glass autoclave (supplied by Taiatsu Techno Corporation, Hyper Glaster, TEM-V1000N), after being replaced with nitrogen of 99 volume % or more, heated to 180° C., and stirred for 2 hours until the polymers were dissolved. At that time, the concentration of oxygen is 1% or less theoretically. Thereafter, 350 g of water was dropped as the poor solvent at a speed of 2.92 g/min. through a feeding pump. At the time added with the ion exchange water of about 200 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 34.0 g of solid material colored to gray. When the obtained powder were observed by a scanning electron microscope, they were polyamide microparticles having a true sphere-like particle shape, an average particle diameter of 15.0 μm, and a particle diameter distribution index of 1.11. The heat of fusion of the polyamide used in this Example was 23.7 J/g, and the SP value was determined by measurement method and was 23.3 $(J/cm^3)^{1/2}$.

Further, when this organic solvent, the polymer A and the polymer B were dissolved separately under a condition of 180° C. and left at a stationary condition and observed, it was understood that this system caused phase separation into two phases at a volume ratio of 3/7 (polymer A solution phase/polymer B solution phase (volume ratio)), and the estimated value of the interfacial tension of this system was 2 mN/m or less. The solubility (room temperature) of polyamide relative to water, which was the poor solvent, was 0.1 mass % or less.

When the molecular weight of polyvinyl alcohol in the filtrated solution after finishing to make particles was determined, the weight average molecular weight was 41,800, and it increased. As compared to Example 1, because the molecular weight of polyvinyl alcohol increased, although recycling of the filtrated solution was difficult, microparticles having a narrow particle diameter distribution could be obtained.

Example 26

Process of Producing Polyamide Microparticles Using Usual PVA 35 g of polyamide (weight average molecular weight: 17,000, "TROGAMID" (registered trademark), CX7323, supplied by Daicel-Evonik Ltd.) as the polymer A, 287 g of N-methyl-2-pyrrolidone as the organic solvent and 28 g of polyvinyl alcohol (supplied by Wako Pure Chemical Industries, Ltd., PVA-1500, weight average molecular weight: 29,000, SP value: 32.8 $(J/cm^3)^{1/2}$, content of sodium acetate: 0.2 mass %) as the polymer B were added into a 1,000 ml pressure resistant glass autoclave (supplied by Taiatsu Techno Corporation, Hyper Glaster, TEM-V1000N), the mixture was left under air atmosphere (concentration of oxygen: about 20%) and isolated from outside, heated to 180° C., and stirred for 2 hours until the polymers were dissolved. Thereafter, 350 g of water was dropped as the poor solvent at a speed of 2.92 g/min. through a feeding pump. At the time added with the ion exchange water of about 200 g, the system changed to white color. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 34.0 g of brown solid material. When the obtained powder were observed by a scanning electron microscope, they were polyamide microparticles having a true sphere-like particle shape, an average particle diameter of 15.2 μm, and a particle diameter distribution index of 1.30. The heat of fusion of the polyamide used in this Example was 23.7 J/g, and the SP value was determined by measurement method and was 23.3 $(J/cm^3)^{1/2}$.

Further, when this organic solvent, the polymer A and the polymer B were dissolved separately under a condition of 180° C. and left at a stationary condition and observed, it was understood that this system caused phase separation into two phases at a volume ratio of 3/7 (polymer A solution phase/polymer B solution phase (volume ratio)), and the estimated value of the interfacial tension of this system was 2 mN/m or less. The solubility (room temperature) of polyamide relative to water, which was the poor solvent, was 0.1 mass % or less.

The filtrated solution after finishing to make particles was changed in color to brown, and when the molecular weight of polyvinyl alcohol in the filtrated solution was determined, the weight average molecular weight indicated to be 80,000. As compared to Example 1, because the molecular weight of polyvinyl alcohol increased, although recycling of the filtrated solution was difficult, microparticles having a narrow particle diameter distribution could be obtained.

Comparative Example 1

Process of Producing Polyester Elastomer Microparticles at a Temperature Lower than 100° C.

3.5 g of polyester elastomer "Hytrel" (registered trademark) 7247 (supplied by Du Pont-Toray Co., Ltd., weight average molecular weight: 29,000), 343.0 g of N-methyl-2-pyrrolidone and 3.5 g of polyvinyl alcohol little with content of sodium acetate prepared in Reference Example 5 (supplied by Wako Pure Chemical Industries, Ltd., PVA-1500, weight average molecular weight: 29,000, reduced in content of sodium acetate down to 0.05 mass % by washing with methanol) were added into a 1,000 ml pressure resistant glass autoclave (supplied by Taiatsu Techno Corporation, Hyper Glaster, TEM-V1000N), after being replaced with nitrogen, heated to 180° C., and stirred for 4 hours until the polymers were dissolved. Thereafter, the temperature was lowered down to 80° C., and 350 g of ion exchange water was dropped as the poor solvent at a speed of 2.92 g/min. through a feeding pump. After the whole amount of water was completely poured, the temperature was lowered while being stirred, the obtained suspension was filtered, re-slurry washing was performed by adding 700 g of ion exchange water, and the filtrated substances were vacuum dried at 80° C. for 10 hours to obtain 3.30 g of white solid materials. When the obtained powder were observed by a scanning electron microscope, they were porous microparticles. When the average particle diameter was calculated by using a scanning electron microscope, they were polyester elastomer microparticles having a volume average particle diameter of 55.6 μm, and a particle diameter distribution index of 20.0. The microparticles were obtained as aggregates of microparticles with about 10 μm, and in this manner, although microparticles themselves could be obtained, their quality was not satisfactory as compared with those obtained in Examples 12 or 13.

Example 27

Reflector Using Polymer Microparticles Composed of Thermoplastic Resin Containing Ether Bond (1) Preparation of Coating Solution:
Coating solutions for forming coating layers were prepared by compounding the raw materials for the coating solutions in order of the following materials from [1] to [4], and by stirring them for 10 minutes by a universal stirrer.
[1] Purified Water
[2] Material A <Polyester-Based Binder Resin>:
Pesresin A-215 (supplied by Takamatsu Oil & Fat Co., Ltd., 30 wt % solution: containing carboxylic group and hydroxyl group) was diluted with purified water to prepare 25 wt % solution.

After the whole amount of water was completely poured, the system was stirred for 30 minutes, the obtained suspension was filtered, washed by 100 g of ion exchange water, and vacuum dried at 80° C. for 10 hours to obtain 3.1 g of white solid materials. When the obtained powder were observed by a scanning electron microscope, they were polyether ester copolymer microparticles having a true sphere-like particle shape, a number average particle diameter of 13.2 μm, a volume average particle diameter of 15.4 μm, and a particle diameter distribution index of 1.17. When observed by a scanning electron microscope, they were true sphere-like microparticles.
(Vi) Comparison Particle 2:
The following particles containing no ether bond were used.
Water dispersion of 40 wt % solution prepared by mixing Techpolymer MBX-8 (crosslinked PMMA particles, number average particle diameter: 8 μm, volume average particle diameter: 11.7 μm, particle diameter distribution index: 1.46, supplied by Sekisui Plastics Co., Ltd.) into purified water. Ether bond is not contained in the particle.
The compounding ratios of [1] to [4] are shown in Table 1.

TABLE 1

| | Composition of coating solution (part by weight) | | | | | | | | |
|---|---|---|---|---|---|---|---|---|---|
| | | | | [4] Organic particle dispersed solution | | | | | |
| | [1] Purified water | [2] Material A | [3] Material B | Example 14 | Example 15 | Example 16 | Example 17 | Comparison particle 1 | Comparison particle 2 |
| Estimation Example 1 | 80.5 | 4.3 | 0.2 | 15.0 | | | | | |
| Estimation Example 2 | 67.3 | 17.1 | 0.6 | | | 15.0 | | | |
| Estimation Example 3 | 40.7 | 42.8 | 1.5 | | | 15.0 | | | |
| Estimation Example 4 | 49.6 | 34.2 | 1.2 | | 15.0 | | | | |
| Estimation Example 5 | 67.3 | 17.1 | 0.6 | | | | 15.0 | | |
| Comparative Estimation Example 1 | 67.3 | 17.1 | 0.6 | | | | | 15.0 | |
| Comparative Estimation Example 2 | 67.3 | 17.1 | 0.6 | | | | | | 15.0 |

[3] Material B <Interfacial Active Agent>:
"NOVEC" (registered trademark) FC-4430 (supplied by Ryoko Chemical Co., Ltd., 5 wt % solution) was used.
[4] Organic Particle Dispersed Solution:
Organic particle dispersed solution was prepared by adding purified water to organic particles so that the organic particles became 40 mass %.
The organic particles are as follows.
(i) Example 14
(ii) Example 15
(iii) Example 16
(iv) Example 17
(v) Comparison Particle 1:
Particles with a low elastic modulus were produced by the following process and used.
3.5 g of "Hytrel" (registered trademark) 3046 (supplied by Du Pont-Toray Co., Ltd., weight average molecular weight: 23,000, flexural elastic modulus: 20 MPa), 43 g of N-methyl-2-pyrrolidone as the organic solvent and 3.5 g of polyvinyl alcohol (supplied by Nippon Synthetic Chemical Industry Co., Ltd., "Gohsenol" (registered trademark) GL-05) were added into a 100 ml four-neck flask, heated to 90° C., and stirred until the polymers were dissolved. After the temperature of the system was returned to 80° C., while stirring at 450 rpm, 50 g of ion exchange water was dropped as the poor solvent at a speed of 0.41 g/min. through a feeding pump.

(2) Film Formation:
After the mixture of PET of 80 parts by weight and cyclic olefin copolymer resin of 20 parts by weight was vacuum dried at a temperature of 180° C. for 3 hours, it was supplied to an extruder A, and melt extruded at a temperature of 280° C. Further, after PET of 100 parts by weight was vacuum dried at a temperature of 180° C. for 3 hours, it was supplied to an extruder B, and melt extruded at a temperature of 280° C. The resins from the respective extruders A and B were joined so as to be laminated in order of B/A/B in the thickness direction, and thereafter, the laminate was introduced into a T die.
Then, a molten laminated sheet was formed by extruding the laminate from the T die in a sheet-like form, and the molten laminated sheet brought into close contact with a drum controlled with the surface temperature at 25° C. by using electrostatic application method, and cooled and solidified thereon to obtain a non-stretched laminated film. At that time, the film surface contacted with the drum was referred to as a back surface, and the film surface contacted with air was referred to as a surface. Succeedingly, after the non-stretched laminated film was preheated by a group of rolls (preheating rolls) heated at a temperature of 80° C., it was stretched at a draw ratio of 3.5 times in the longitudinal direction utilizing a difference between the circumferential speeds of the rolls, and it was cooled by a group of rolls controlled at a temperature of 25° C. to obtain a uniaxially stretched film.

Further succeedingly, corona discharge treatment was performed in air to the surface of the uniaxially stretched film, and the above-mentioned coating solution for forming a coating layer was applied to the treated surface by employing a bar coating method using a wire bar so that the coating thickness became 15 μm.

The above-described uniaxially stretched film applied with the coating solution to form a coating layer was introduced into a preheating zone controlled at 100° C. in a tenter while being held by clips at both width ends thereof, and after being dried therein, it was continuously stretched in a following heating zone controlled at 100° C. in a direction perpendicular to the longitudinal direction (transverse direction) at a draw ratio of 3.5 times. Further succeedingly, heat treatment at 190° C. was performed in a heat treatment zone in the tenter, and after relax treatment was performed in the transverse direction at 190° C. at 6%, it was wound after being gradually cooled to obtain a white laminated film in which the coating layer with a thickness of 200 nm is provided on the film with a thickness of 188 μm. The film thickness of the layer B was 10 μm.

(3) Estimation of Film Properties:

The estimation of film properties was carried out by the following methods.

(3.1) Confirmation of Coating State in Coating Layer of Organic Particles:

A cut piece with a thickness of 70-100 nm was cut out from the laminated film in the sectional direction by a microtome, and it was dyed by ruthenium tetroxide. The dyed cut piece was observed using a transmission electron microscope "TEM2010" (supplied by JEOL Ltd.) at an enlarged condition 500 to 10,000 times, and from the taken section photograph, the coating state in the coating layer of the organic particles was confirmed and determined as follows:

A: case where the whole of the particles are coated by the coating material

B: case where 80% or more of the particles are coated by the coating material

C: case where coating of the particles by the coating material was 40% or more

D: case where coating of the particles by the coating material was less than 40%.

(3.2) Estimation of White Spot of Display:

The laminated film was incorporated into a back light unit of an LED display supplied by AUO Corporation (T240HW01), it was set so that the screen thereof became horizontal, and it was lit. When the center of the screen was pressed by a predetermined weight, the state generating white spot was determined by the following ranks:

F: case where white spot is generated without weight

E: case where white spot is generated by a weight of 0.5 kg

D: case where white spot is generated by a weight of 1.0 kg

C: case where white spot is generated by a weight of 1.5 kg

B: case where white spot is generated by a weight of 2.0 kg

A: case where white spot is not generated by a weight of 2.0 kg.

The back light was a side light type back light, it had a light guide plate and a light source (LED), and the light source was positioned at an edge part of the light guide plate. In this estimation of white spot, for example, as examples for estimating white spot are shown in FIG. 2, a case where white spot is not generated (FIG. 2(A)) and a case where white spot is generated (FIG. 2(B)) can be clearly discriminated from each other.

(3.3) Appearance of Coating:

With the laminated films obtained in Estimation Examples or Comparative Estimation Examples, appearance was observed utilizing a reflected light of a fluorescent lamp. The estimation ranks were as follows, ranks A and B were determined to be good, and rank D was determined to be a failure state.

A: Irregularity of coating and missing of coating are not observed.

B: Although irregularity of coating and missing of coating are partially observed, when the laminated film is incorporated into a back light unit of an LED display supplied by AUO Corporation (T240HW01) and it is set so that the screen thereof becomes horizontal and it is lit, irregularity is not observed.

C: Irregularity of coating and missing of coating are observed, when the laminated film is incorporated into a back light unit of an LED display supplied by AUO Corporation (T240HW01) and it is set so that the screen thereof becomes horizontal and it is lit, irregularity is slightly observed.

D: The appearance is remarkably damaged by irregularity of coating and missing of coating.

(3.4) Estimation of Fittability of Particles:

"TORAYSEE MK cloth" (registered trademark, supplied by Toray Industries, Inc.) sold on the market was stuck on the bottom surface of a SUS block (eight: 300 g) having a bottom surface of 4 cm×4 cm using a pressure sensitive adhesive double coated tape. Chipping test was performed by slipping the above-described SUS block 10 times on the coating surface of the laminated film.

Glosses before and after the chipping test were compared. The gloss was measured using a digital variable-angle gloss meter UGV-5B (supplied by Suga Test Instruments Co., Ltd.), from the coating layer side of the white laminated film, based on JIS Z-8741 (1997). The measurement condition was set at an incident angle of 60 degrees and a light-intercepting angle 60 degrees. The number of samples was set at n=5, the respective glosses were measured and the average value thereof was calculated. Further, a surface SEM photograph was taken, falling off trace thereon was observed, and 100 points as the total of (number of particles+falling off trace) were observed, and determined by the following ranks:

A: case where falling off trace is none

B: case where falling off traces are present by 5 points or less

C: case where falling off traces are present by 10 points or less

D: case where falling off traces are present by 30 points or less

E: case where falling off traces more than 30 points are present.

The result of estimation of film properties described in (3.1) to (3.4) are shown in Table 2.

TABLE 2

| | Property of particle | Coating | Estimation of properties | | | | |
|---|---|---|---|---|---|---|---|
| | | | | | Estimation of fittability of particles | | |
| | material Flexural elastic modulus (MPa) | state of organic particles | Estimation of white spot of display | Appearance of coating | Gloss before chipping test | Gloss after chipping test | Observation result of falling off trace |
| Estimation Example 1 | 600 | B | C | A | 74 | 79 | B |
| Estimation Example 2 | 1100 | A | A | A | 74 | 79 | A |
| Estimation Example 3 | 1100 | A | A | B | 63 | 63 | A |
| Estimation Example 4 | 1100 | A | B | A | 75 | 76 | A |
| Estimation Example 5 | 1800 | A | A | A | 74 | 76 | A |
| Comparative Estimation Example 1 | 20 | A | E | A | 76 | 87 | A |
| Comparative Estimation Example 2 | 3100 | D | D | D | 71 | 120 | E |

It was understood that any of particles prepared in Examples 14, 15, 16 and 17 exhibited good performance when used for a reflector. From this result, it is understood that polymer microparticles characterized by being more than 500 MPa and 3,000 MPa or less in flexural elastic modulus and being composed of a thermoplastic resin containing have high advantages.

INDUSTRIAL APPLICATIONS

Thus, the microparticles produced by our process are easy to realize their industrial production, from the points that particles with a narrow particle diameter distribution can be obtained, that polymer microparticles, in particular, polymer microparticles excellent in thermal resistance, can be produced, and that it is a stable production process. As concrete examples of uses capable of using these thermally resistant microparticles, exemplified are uses for flash-moldable material, rapid prototyping/rapid manufacturing material, paste resin for plastic sol, powder blocking agent, powder flowability improving agent, lubricant, rubber compounding ingredient, polishing agent, viscosity improver, filter material/filter aid, gelatinizer, coagulation agent, additive for paints, oil absorbing material, mold releasing agent, slippage improving agent for plastic films/sheets, antiblocking agent, gloss adjusting agent, frosted finish agent, light diffusion agent, surface hardness improving agent, various modifying agents such as ductility improving material, additive for polymer alloys, various other modifying agents, spacer for liquid crystal display equipment, filler for chromatography, base material/additive for cosmetic foundation, assistant for microcapsules, medical materials for drug delivery system/diagnostic reagents, support agent for perfume/pesticide, catalyst/carrier for chemical reactions, gas adsorption agent, sintered material for ceramic processing, standard particle material for measurement/analysis, particle material for food manufacture industry, material for powder coating, and toner for electrophotographic development. The process has a high industrial applicability as a technology for producing these hopeful materials.

The invention claimed is:

1. A process of producing polymer microparticles wherein, in a system which comprises a polymer (A), a polymer (B) and an organic solvent and can cause phase separation into two phases of a solution phase mainly composed of said polymer (A) and a solution phase mainly composed of said polymer (B) when said polymer (A), said polymer (B) and said organic solvent are dissolved and mixed together, after an emulsion is formed at a temperature of 100° C., said polymer (A) is precipitated by bringing a poor solvent for said polymer (A) into contact with said emulsion, and wherein a temperature at which said poor solvent is brought into contact with said emulsion to precipitate said polymer (A) after said emulsion is formed is a temperature of a cooling crystallization temperature of said polymer (A) or higher.

2. The process according to claim 1, wherein said polymer (A) is a crystalline thermoplastic resin having a melting point of 100° C. or higher.

3. The process according to claim 1, wherein said polymer (A) is a crystalline thermoplastic resin containing at least one structural unit selected from the group consisting of an amide unit, an ester unit, a sulfide unit and a carbonate unit, in a molecular principal chain structure of said polymer (A).

4. The process according to claim 1, wherein said polymer (A) is a crystalline thermoplastic resin selected from the group consisting of a polyamide group, a polyester group and a polyphenylene sulfide group.

5. The process according to claim 1, wherein an SP value of said polymer (B) is 20 $(J/cm^3)^{1/2}$ or higher.

6. The process according to claim 1, wherein solubility into water at 25° C. of said polymer (B) is 1 (g/100 g) or greater.

7. The process according to claim 1, wherein said polymer (B) has a hydroxyl group, an ether group, an amide group or a carboxyl group in a molecular structure of said polymer (B).

8. The process according to claim 1, wherein said polymer (B) is any of a polyvinyl alcohol group, a hydroxyalkyl cellulose, a polyalkylene glycol, a polyvinylpyrrolidone, a water-soluble nylon and a polyacrylic acid.

9. The process according to claim 1, wherein said polymer (B) is a polyvinyl alcohol group, and a content of a sodium acetate in said polyvinyl alcohol group is 0.1 mass % or less.

10. The process according to claim 1, wherein said polymer (B) is a polyvinyl alcohol group, and at a time of forming said emulsion, an acid compound is added into said system.

11. The process according to claim 10, wherein said added acid compound is an acid having a first dissociative index (pKa1) of 4.5 or less, and its decomposition temperature is a boiling point of said poor solvent or higher.

12. The process according to claim 10, wherein said added acid compound is one or more selected from the group consisting of a citric acid, a tartaric acid, a malonic acid, an oxalic acid, an adipic acid, a maleic acid, a malic acid, a phthalic acid, a succinic acid and a polyacrylic acid.

13. The process according to claim 1, wherein an SP value of said organic solvent is 20 $(J/cm^3)^{1/2}$ or higher, and a boiling point thereof is 100° C. or higher.

14. The process according to claim 1, wherein said organic solvent is one or more selected from the group consisting of N-methylpyrrolidone, dimethylsulfoxide, N,N-dimethylformamide, N,N-dimethylacetamide and 1,3-dimethyl-2-imidazolidinone.

15. The process according to claim 1, wherein a solid component and a liquid component are separated after said polymer (A) is precipitated, said poor solvent is removed from a solution containing polymer (B) component removed with microparticles of said polymer (A), and said polymer (A) is added again to a solution having been obtained to form a system which can cause phase separation into two phases of said solution phase mainly composed of said polymer (A) and said solution phase mainly composed of said polymer (B), thereby recycling said organic solvent and said polymer (B).

16. Polymer microparticles produced by the process according to claim 1.

17. Polymer microparticles having a flexural elastic modulus of more than 500 MPa and 3000 MPa or less, and composed of a thermoplastic resin containing an ether bond.

18. The polymer microparticles according to claim 17, wherein an average particle diameter of said microparticles is 1 μm to 100 μm.

* * * * *